(12) United States Patent
Yabe et al.

(10) Patent No.: US 6,628,572 B1
(45) Date of Patent: Sep. 30, 2003

(54) ELECTRONIC EQUIPMENT AND METHOD OF CONTROLLING ELECTRONIC EQUIPMENT

(75) Inventors: Hiroshi Yabe, Shiojiri (JP); Makoto Okeya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/701,610

(22) PCT Filed: Mar. 29, 2000

(86) PCT No.: PCT/JP00/01966

§ 371 (c)(1),
(2), (4) Date: Feb. 12, 2001

(87) PCT Pub. No.: WO00/59091

PCT Pub. Date: Oct. 5, 2000

(30) Foreign Application Priority Data

Mar. 29, 1999 (JP) .............................................. 11-87255

(51) Int. Cl.[7] .................................................. G04B 1/00
(52) U.S. Cl. ........................ 368/204; 320/128; 320/137; 320/166
(58) Field of Search ..................... 368/64, 66, 203–205; 320/128, 137, 166; 323/222, 282

(56) References Cited

U.S. PATENT DOCUMENTS 5,001,685 A  *  3/1991  Hayakawa ................... 368/204
6,172,943 B1 *  1/2001  Yuzuki ........................ 368/204

FOREIGN PATENT DOCUMENTS

| JP | 63-110920 | 5/1988 |
| JP | 6-104015 | 4/1994 |
| JP | 10-108387 | 4/1998 |
| JP | 11-6885 | 1/1999 |
| WO | WO98/06013 | 2/1998 |

* cited by examiner

*Primary Examiner*—Vit Miska
(74) *Attorney, Agent, or Firm*—Mark P. Watson

(57) ABSTRACT

If a supply voltage reaches a voltage level that may lead to detection errors of a supply voltage detecting circuit, then a voltage detecting operation is prohibited if generation of power that can be charged into a high-capacity secondary power source is not detected, while the voltage detecting operation is continued if the generation of power that can be charged into the high-capacity secondary power source is detected.

34 Claims, 18 Drawing Sheets

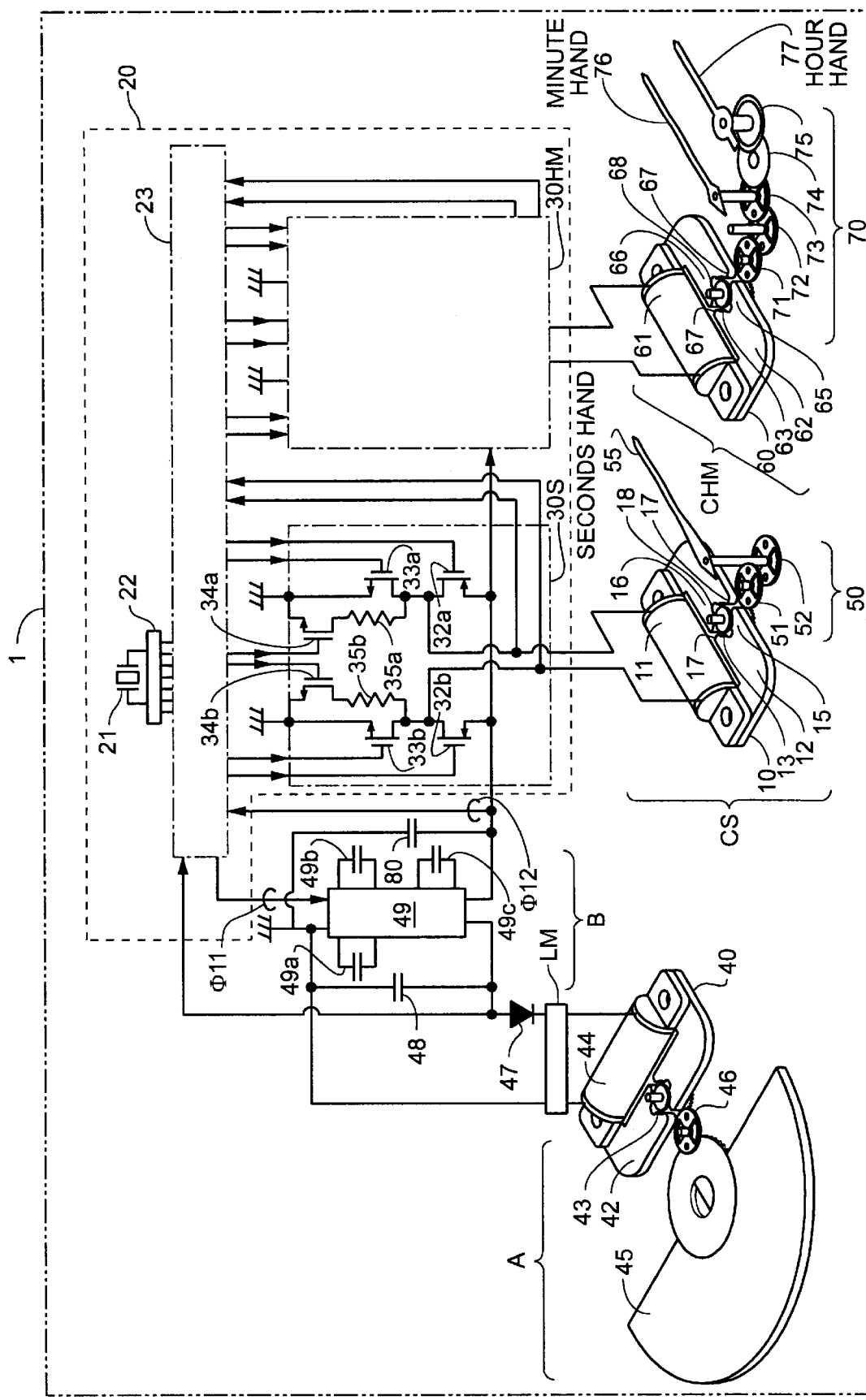
FIG._1

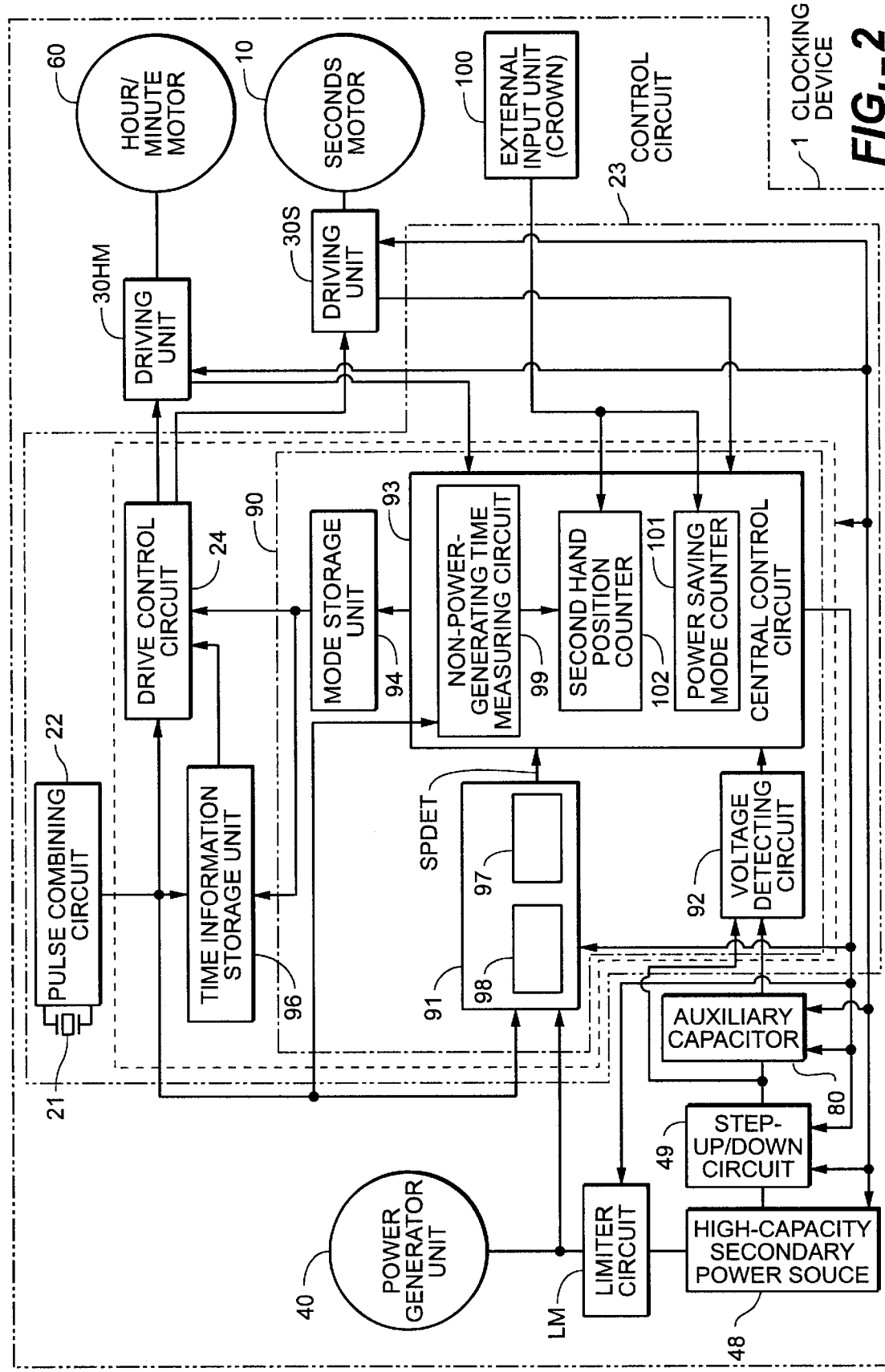
FIG._2

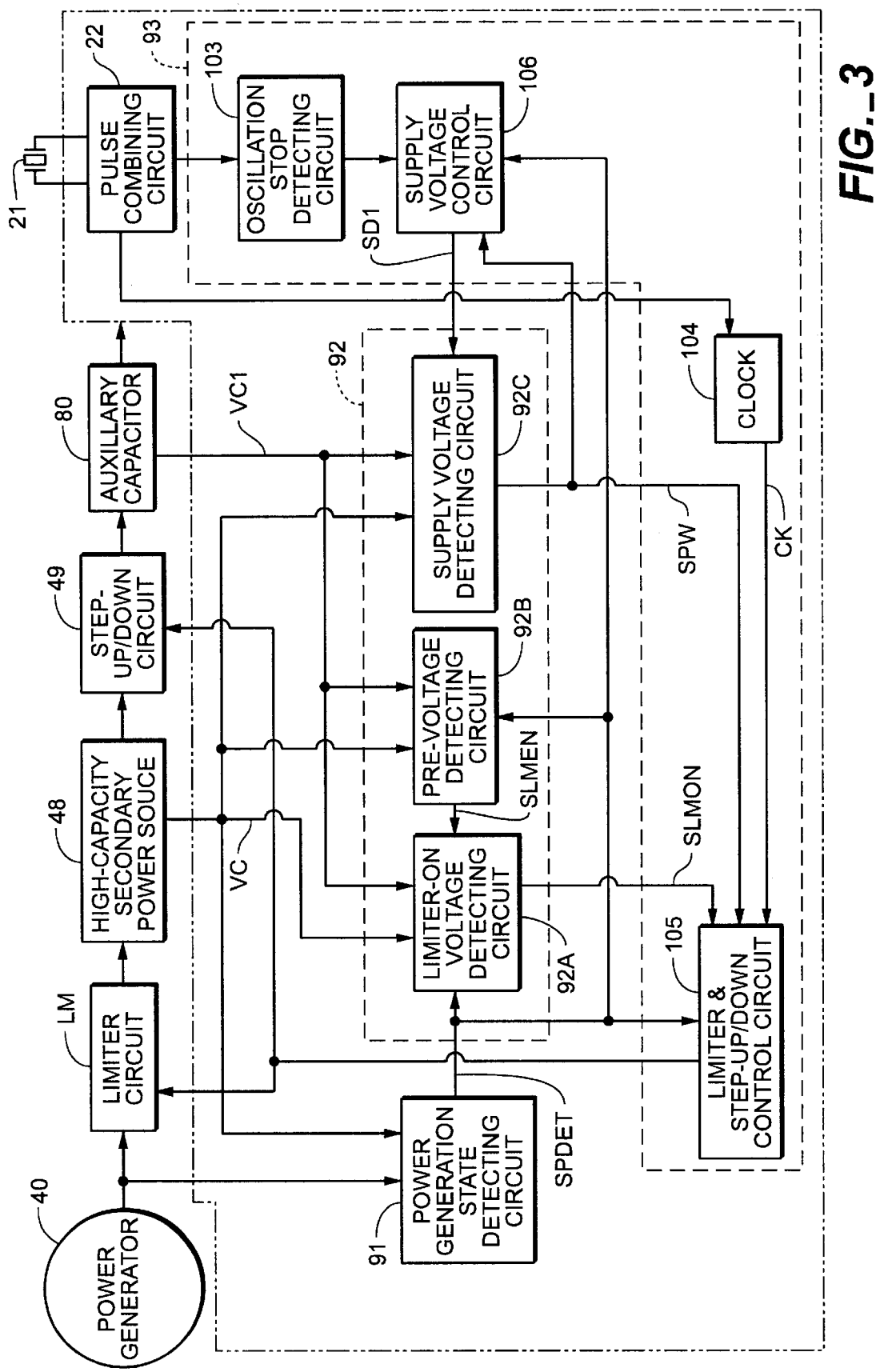
FIG._3

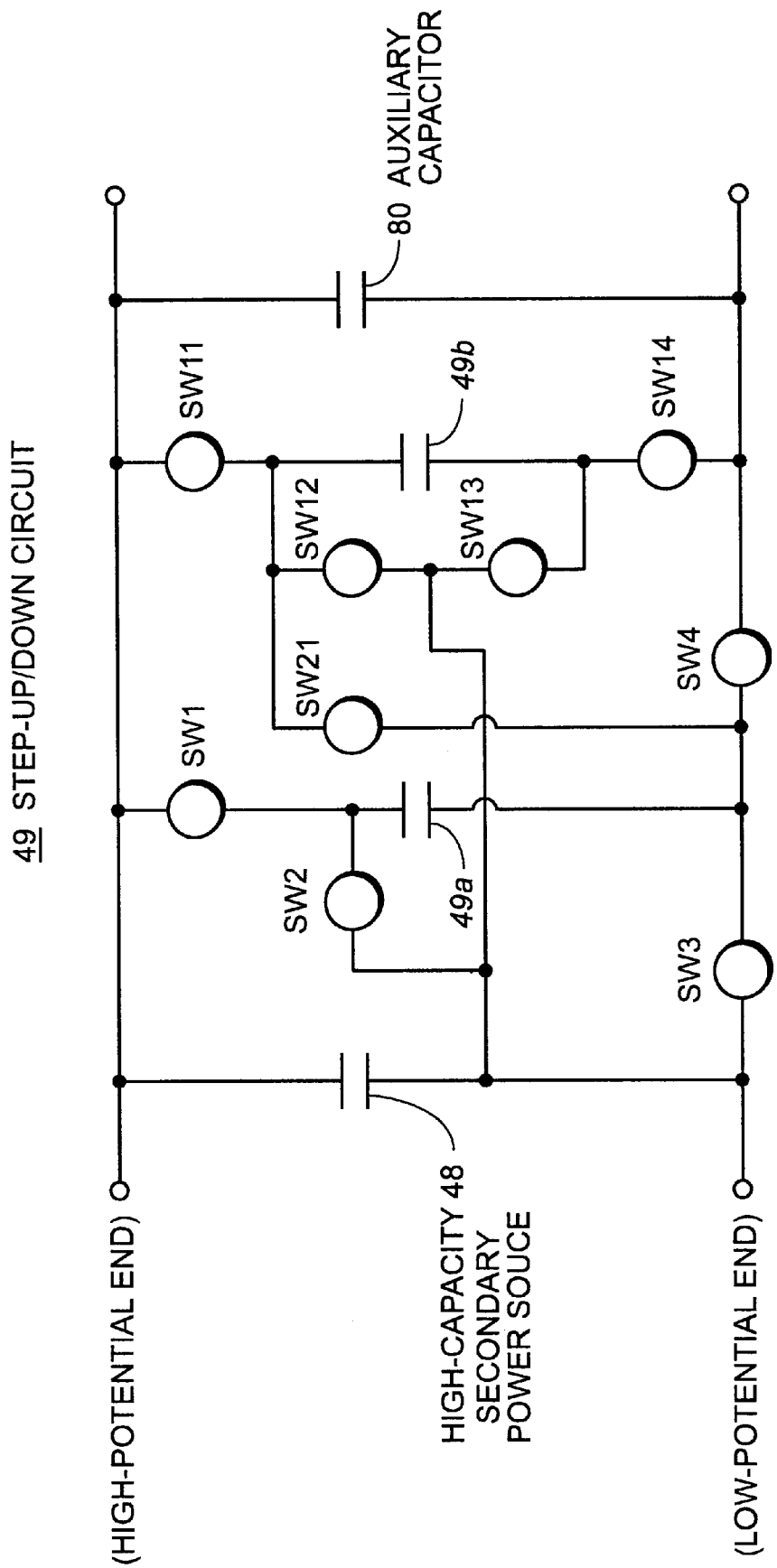
FIG._4

| STEP-UP FACTOR | CONNECTION | SW1 | SW2 | SW3 | SW4 | SW11 | SW12 | SW13 | SW14 | SW21 |
|---|---|---|---|---|---|---|---|---|---|---|
| TRIPLE | PARALLEL | ON | OFF | ON | OFF | ON | OFF | ON | OFF | OFF |
| TRIPLE | SERIAL | OFF | ON | OFF | OFF | OFF | OFF | OFF | ON | ON |
| DOUBLE | PARALLEL | ON | OFF | ON | OFF | ON | OFF | ON | OFF | OFF |
| DOUBLE | SERIAL | OFF | ON | OFF | ON | OFF | ON | OFF | ON | OFF |
| 1.5 TIMES | PARALLEL | ON | OFF | OFF | OFF | OFF | OFF | ON | OFF | ON |
| 1.5 TIMES | SERIAL | OFF | ON | OFF | ON | OFF | ON | OFF | ON | OFF |
| NO BOOSTING (DIRECT CONNECTION) | PARALLEL | OFF | ON | ON | ON | OFF | ON | ON | ON | OFF |
| NO BOOSTING (DIRECT CONNECTION) | SERIAL | OFF | ON | ON | ON | OFF | OFF | ON | OFF | OFF |
| 1/2 TIMES | PARALLEL | ON | OFF | OFF | OFF | ON | OFF | OFF | OFF | ON |
| 1/2 TIMES | SERIAL | ON | OFF | OFF | ON | OFF | OFF | OFF | ON | OFF |

*FIG._5a*

| STEP-UP FACTOR | CONNECTION | SW1 | SW2 | SW3 | SW4 | SW11 | SW12 | SW13 | SW14 | SW21 |
|---|---|---|---|---|---|---|---|---|---|---|
| NO BOOSTING TRANSFER MODE | PARALLEL | ON | OFF | ON | OFF | ON | OFF | ON | OFF | OFF |
| NO BOOSTING TRANSFER MODE | SERIAL | ON | OFF | OFF | ON | ON | OFF | OFF | ON | OFF |

*FIG._5b*

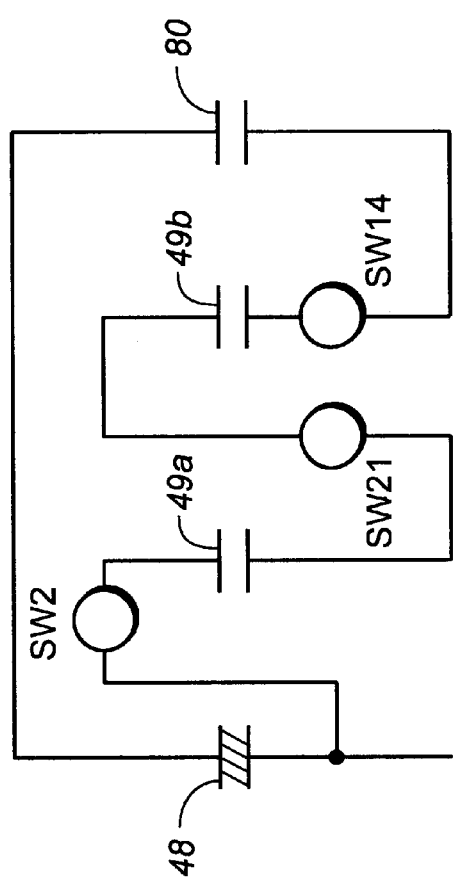
FIG._6b
SERIAL CONNECTION
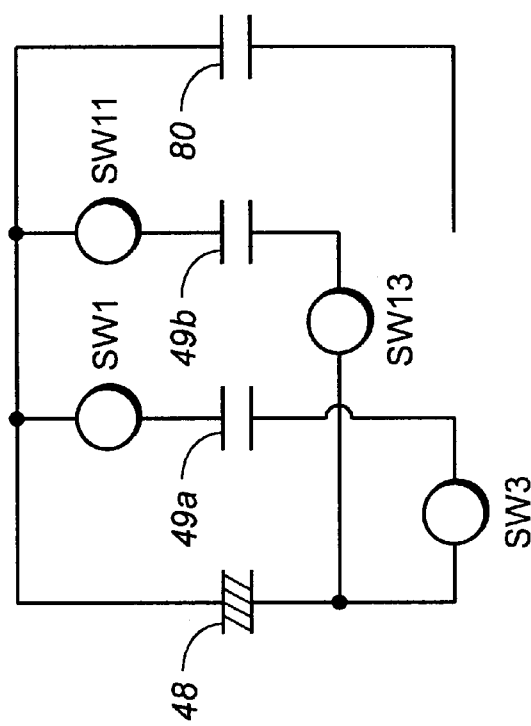
FIG._6a
PARALLEL CONNECTION

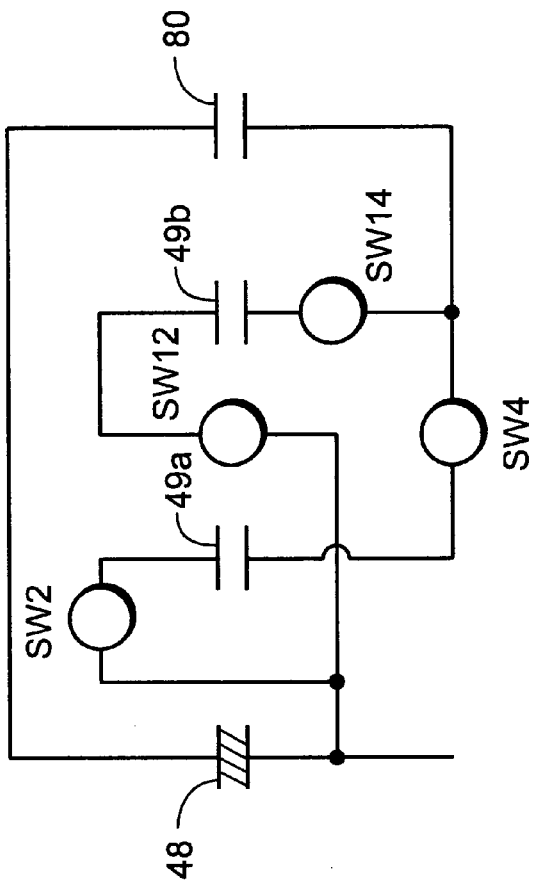
FIG._7b
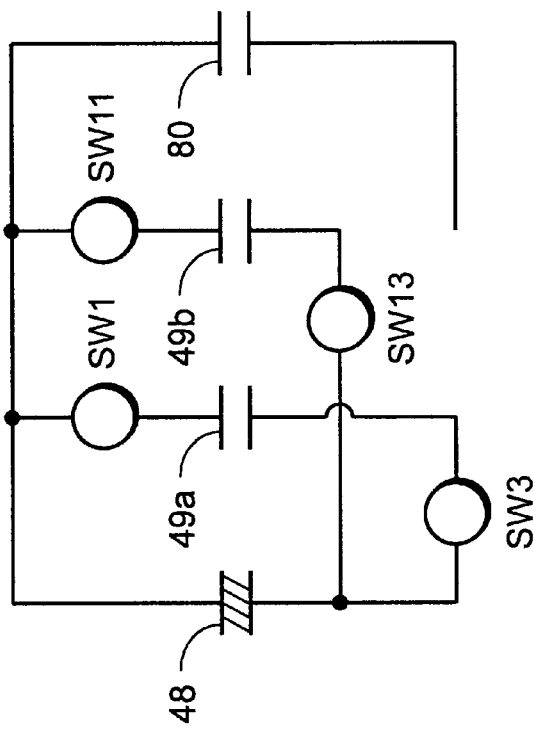
FIG._7a

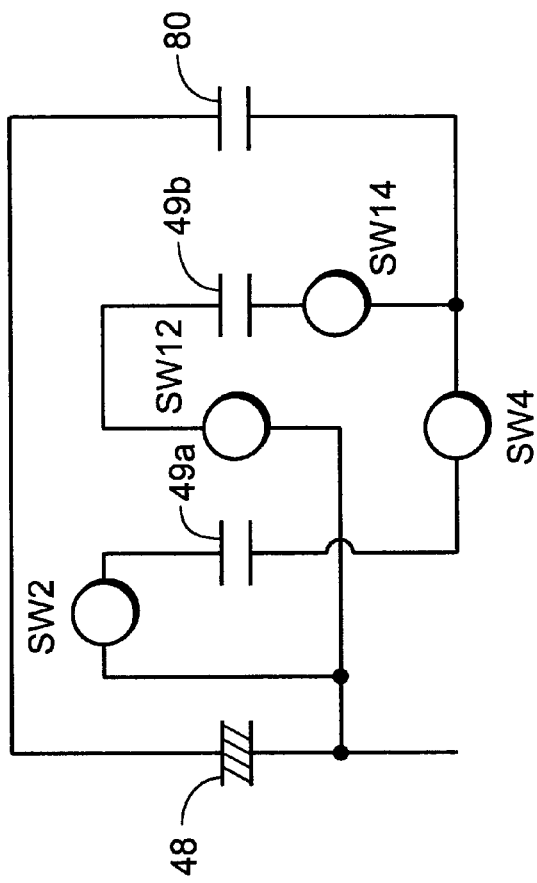
FIG._8b
SERIAL CONNECTION
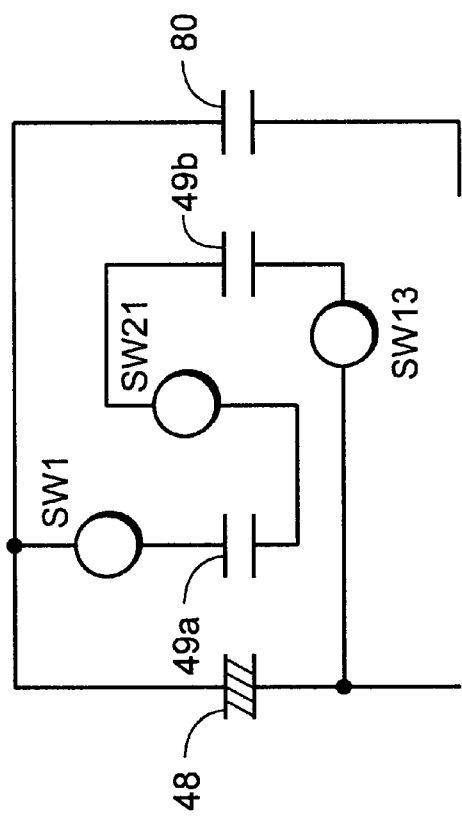
FIG._8a
PARALLEL CONNECTION

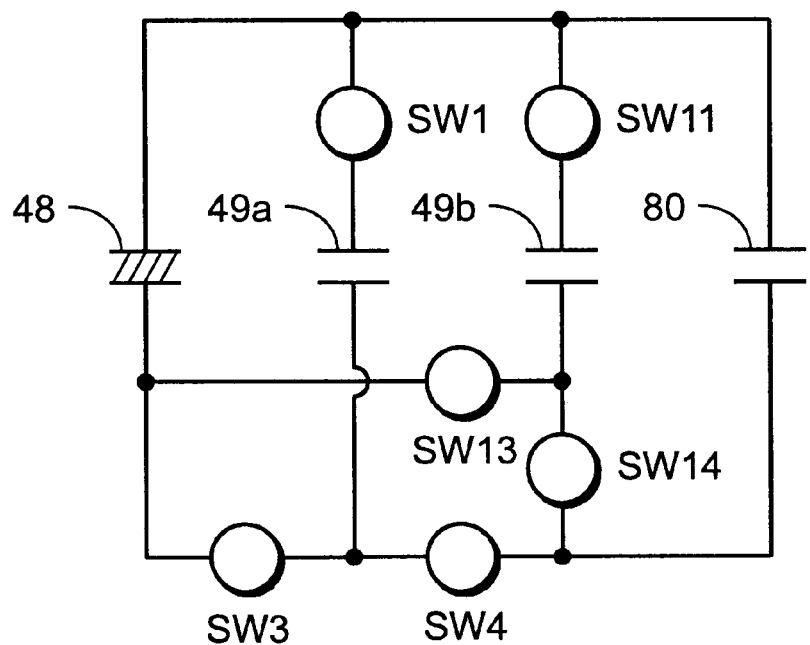
FIG._9a
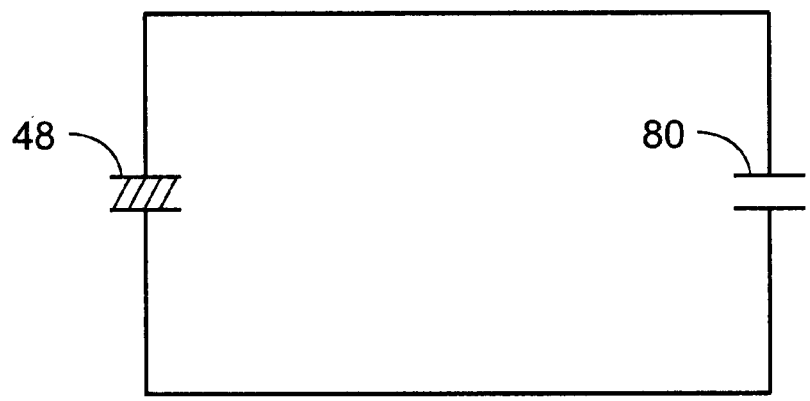
FIG._9b

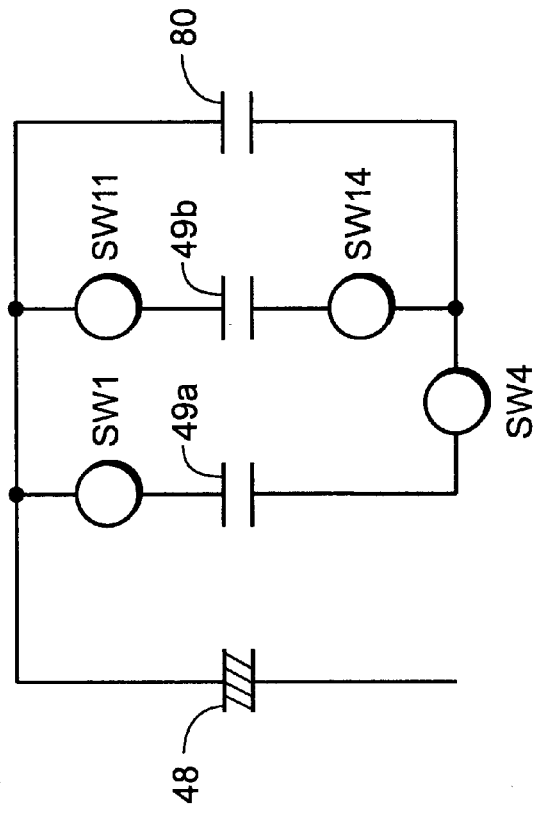
FIG._10b
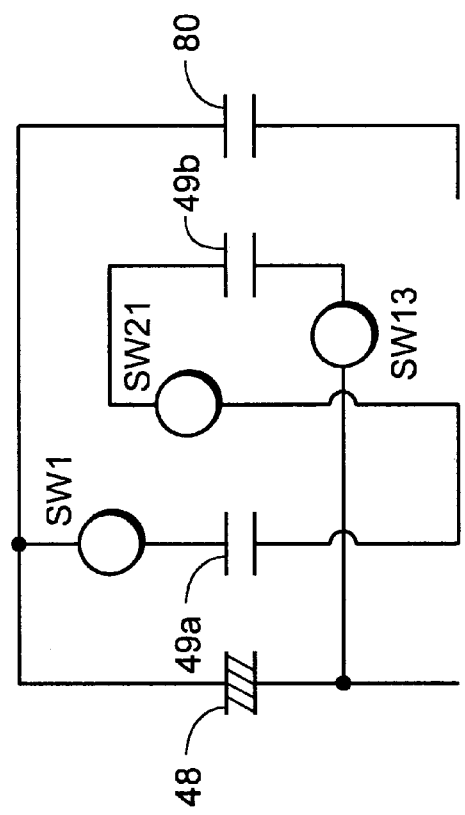
FIG._10a

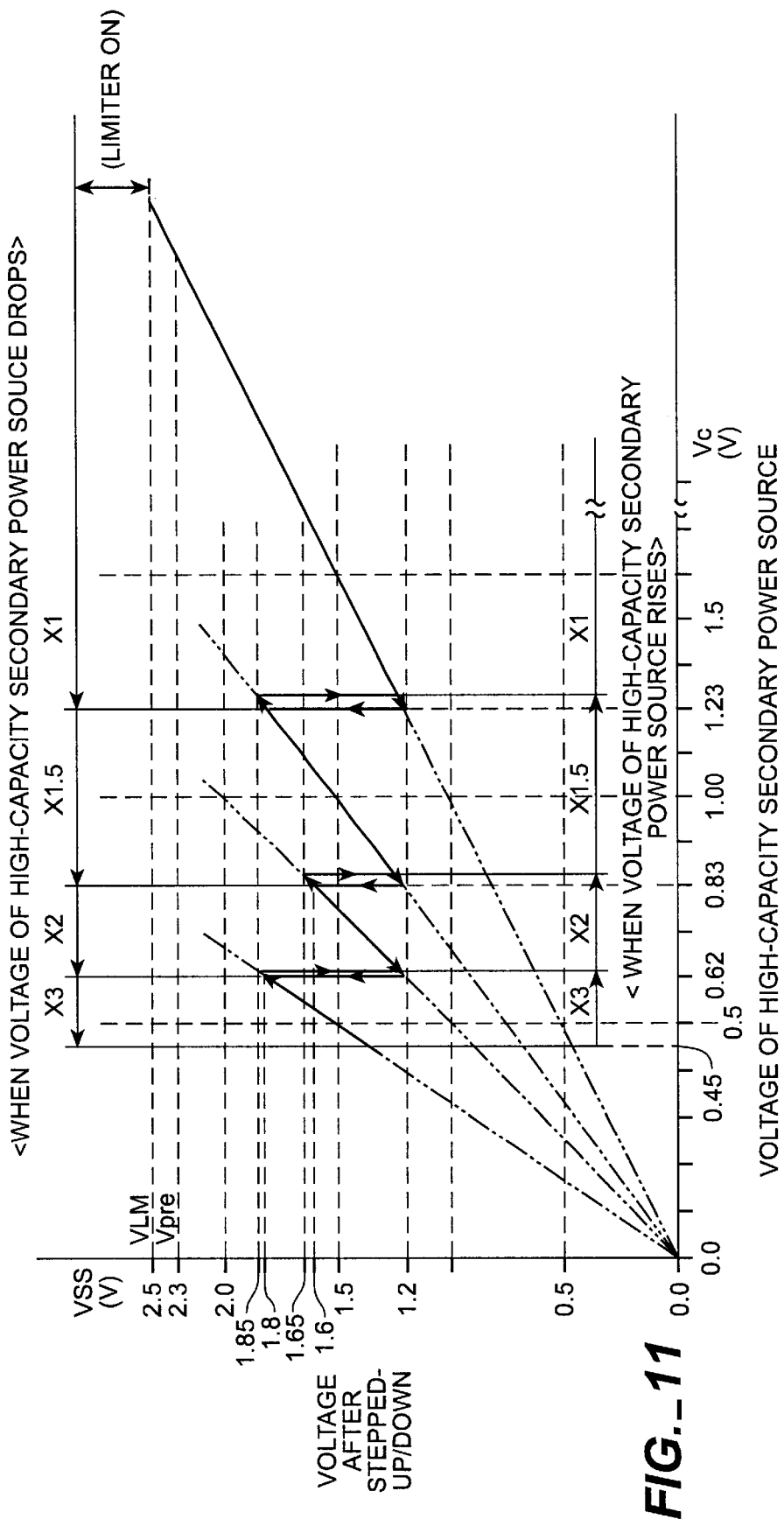
FIG._11

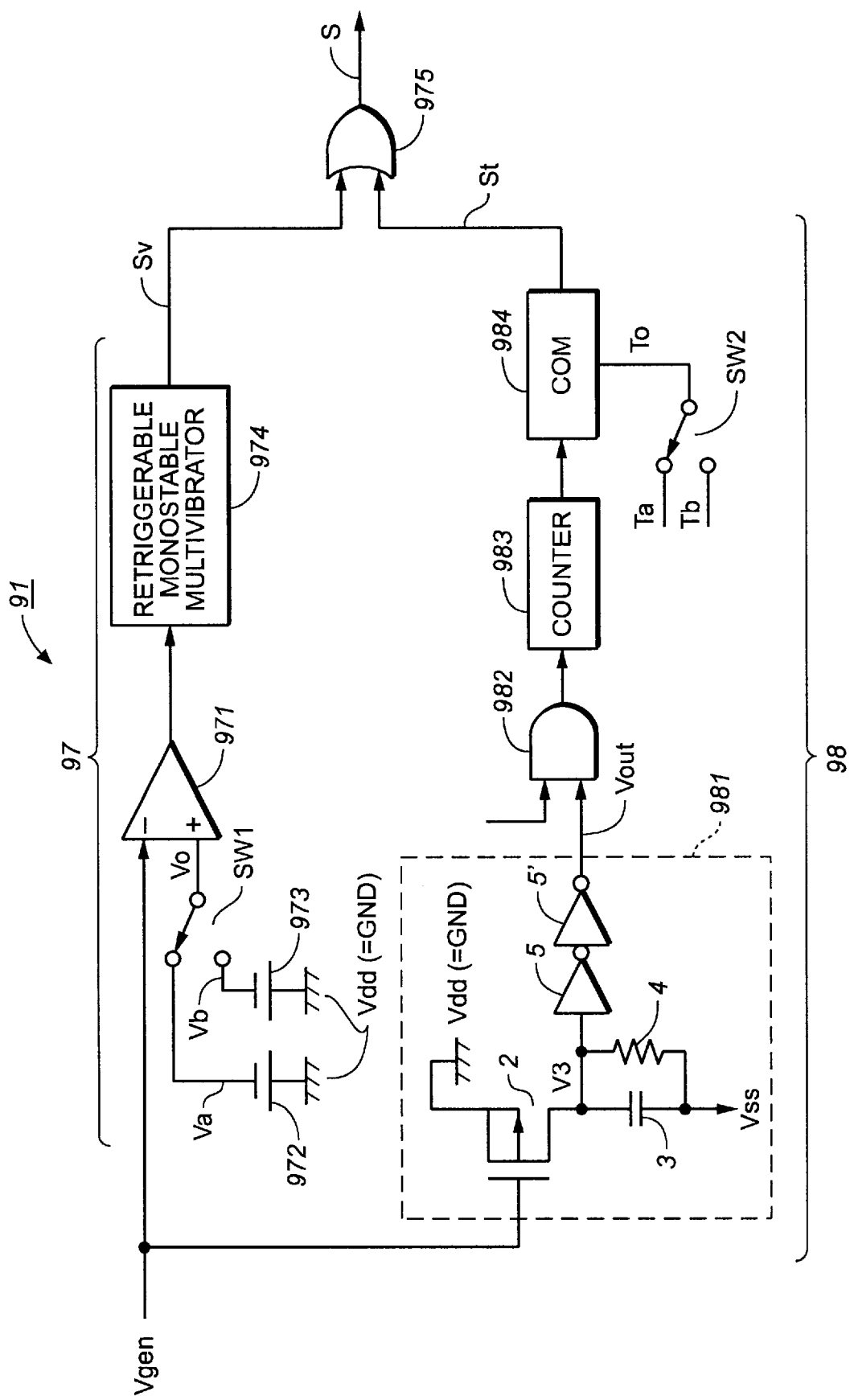
FIG._12

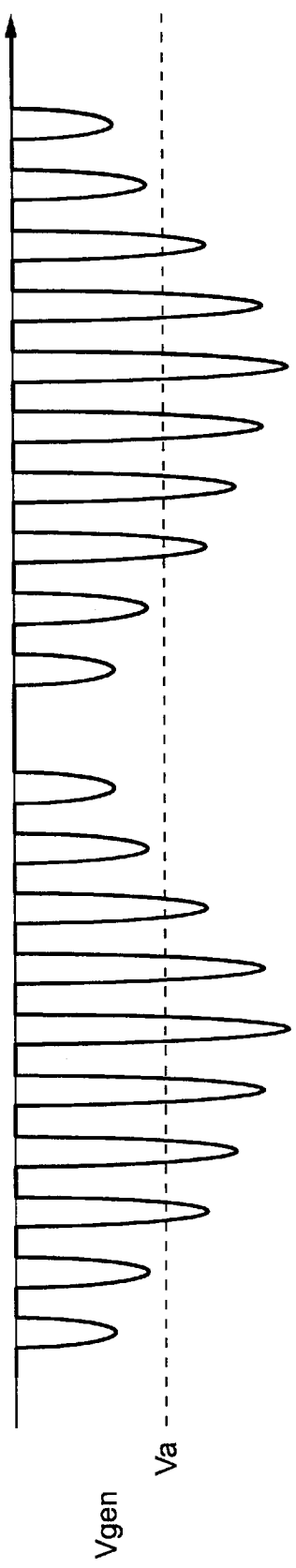
FIG._13a
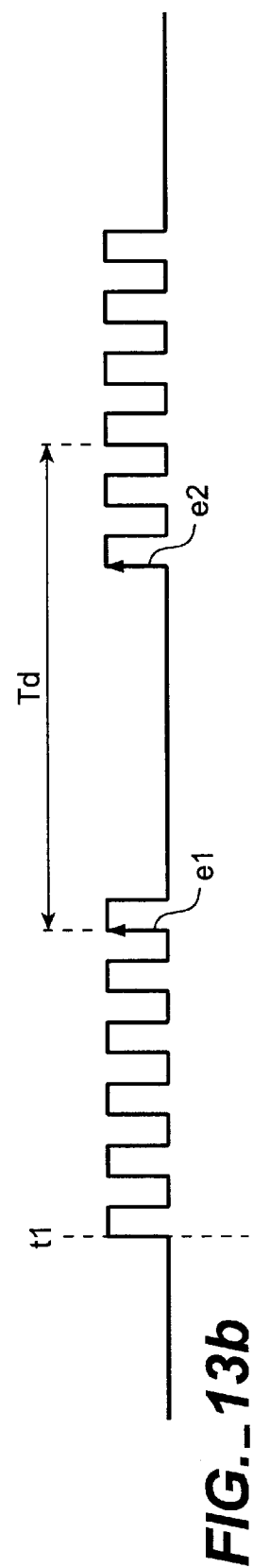
FIG._13b
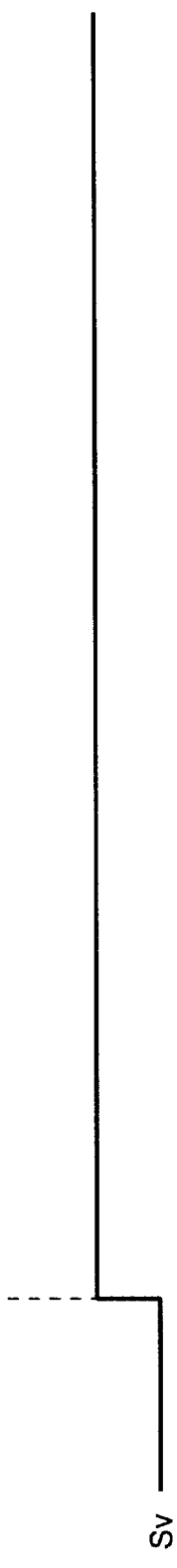
FIG._13c

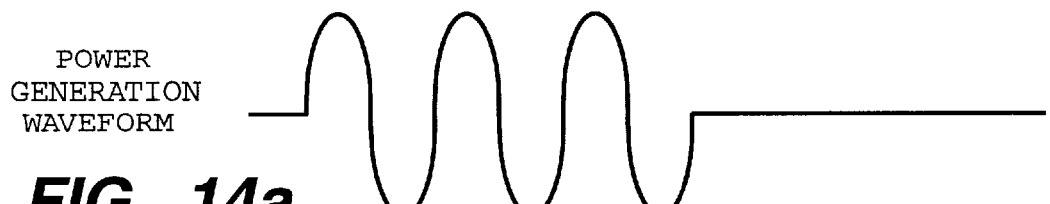
FIG._14a
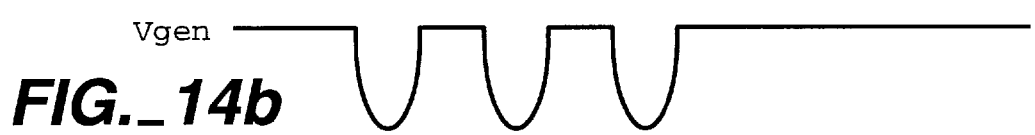
FIG._14b
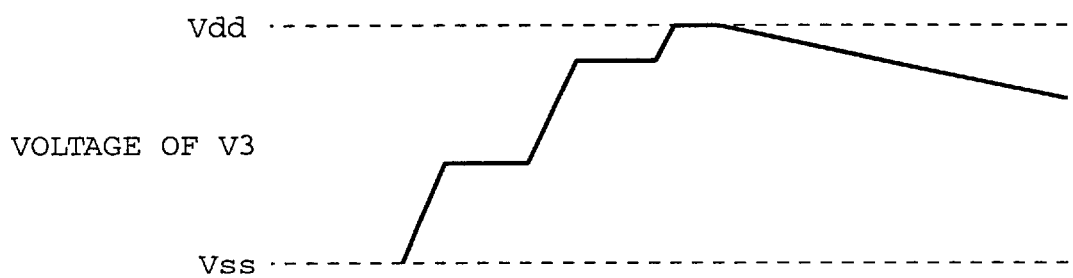
FIG._14c
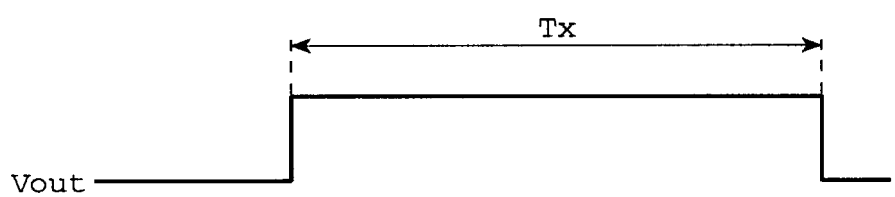
FIG._14d
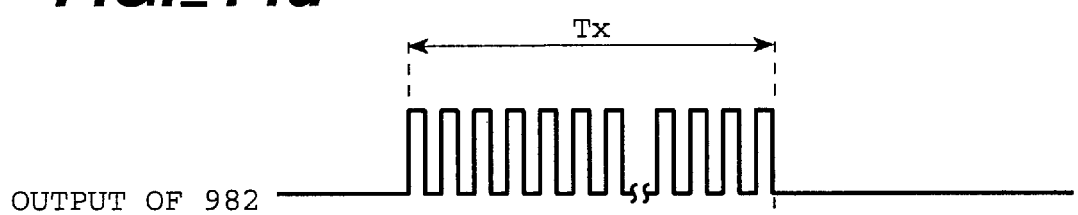
FIG._14e
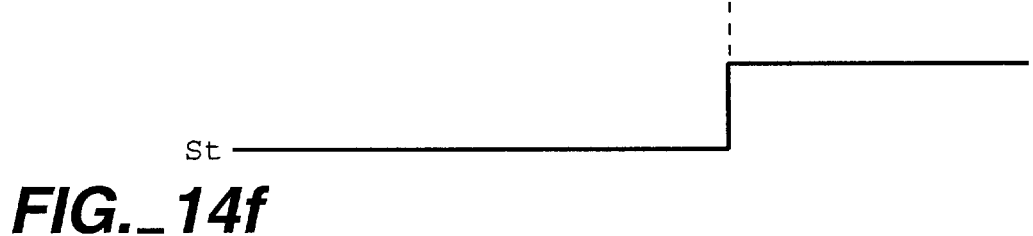
FIG._14f

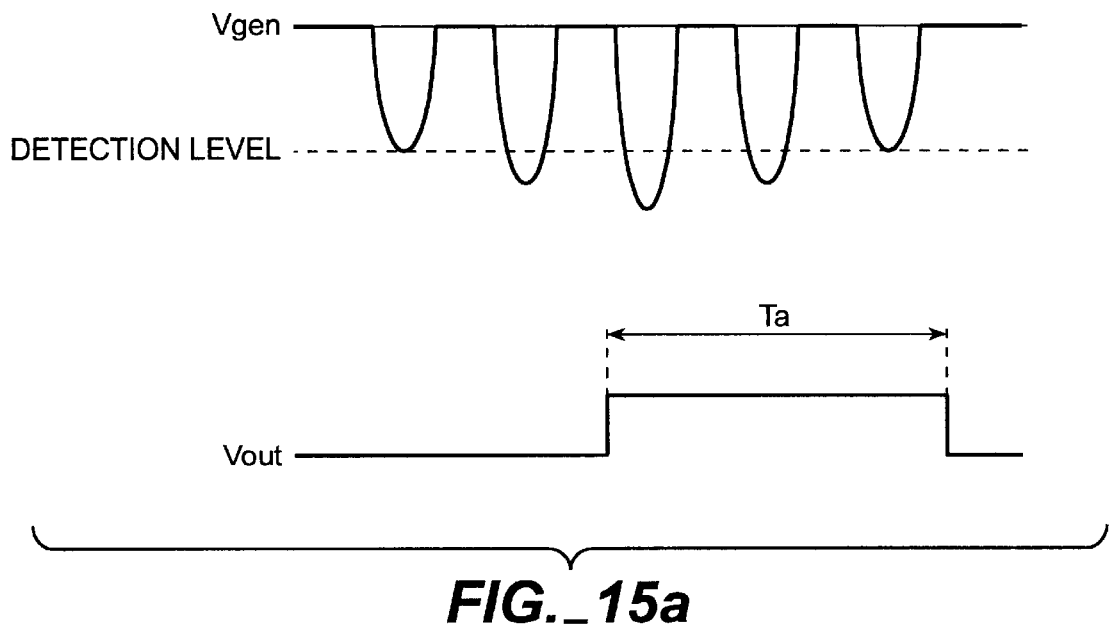
FIG._15a
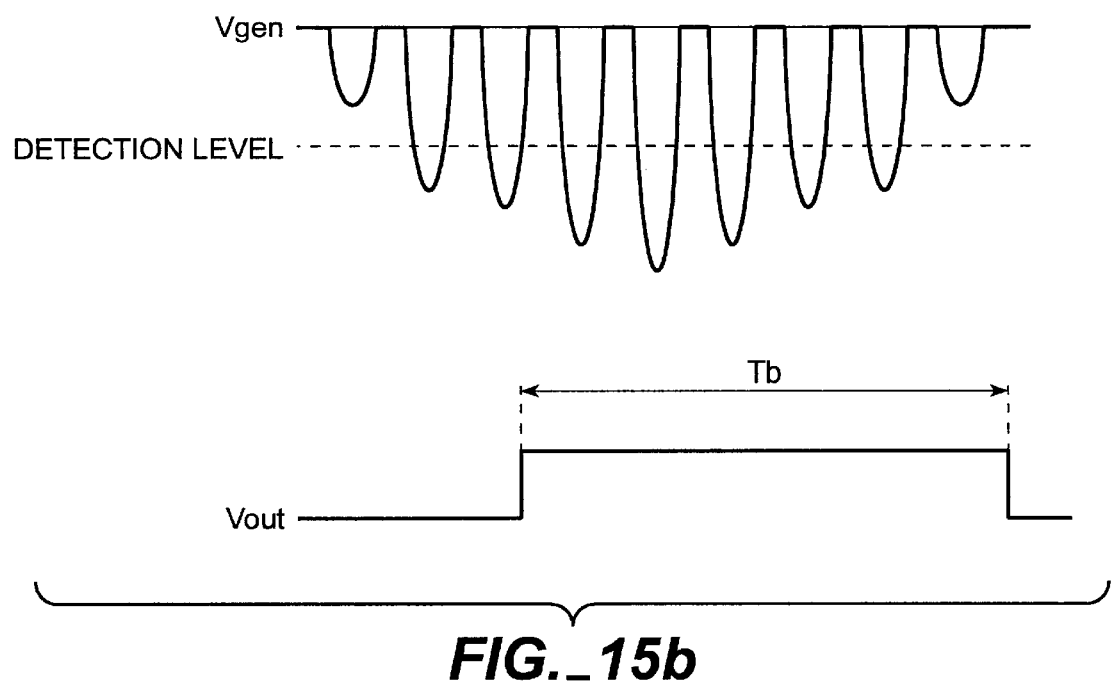
FIG._15b

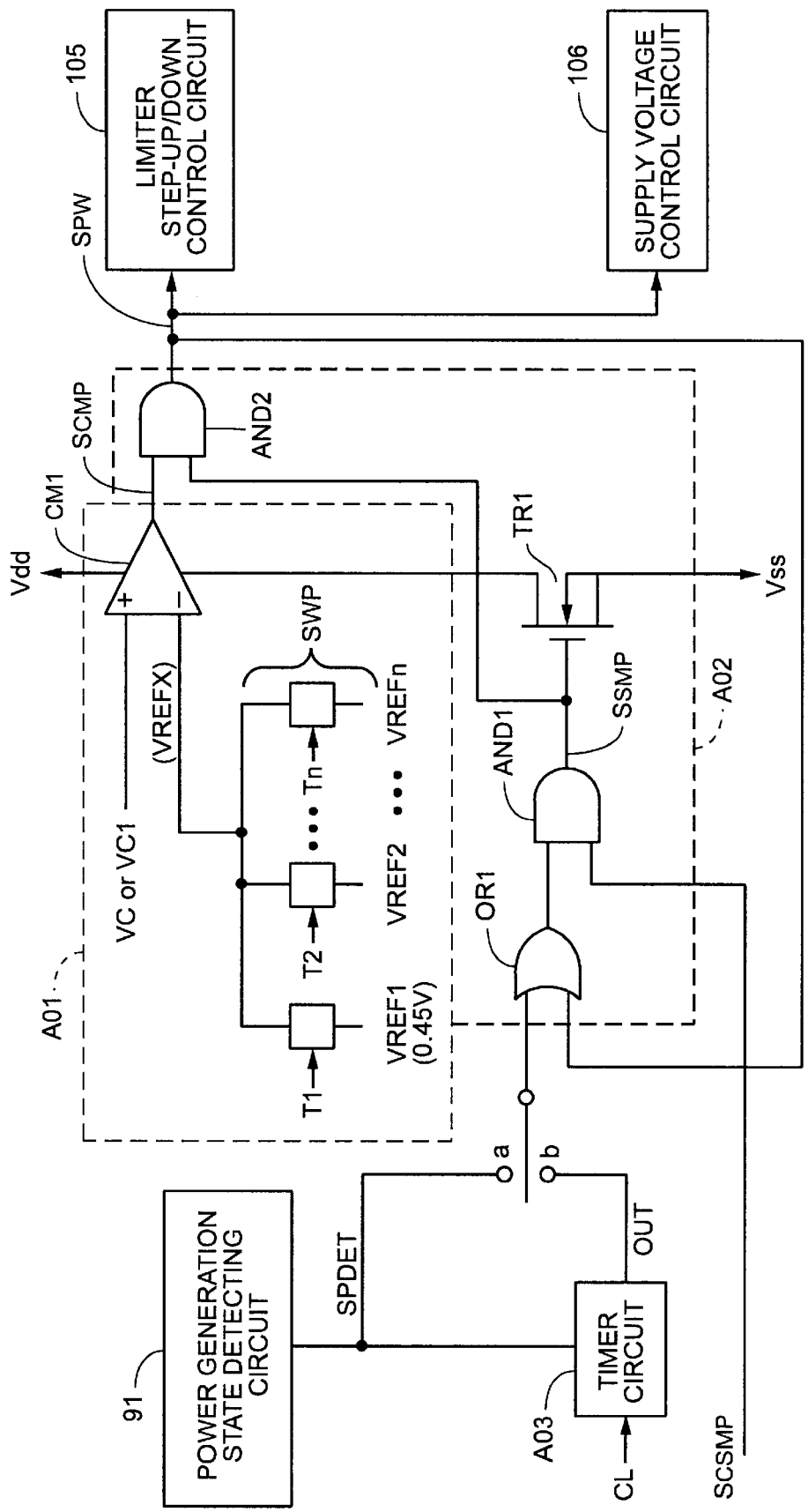
FIG._16

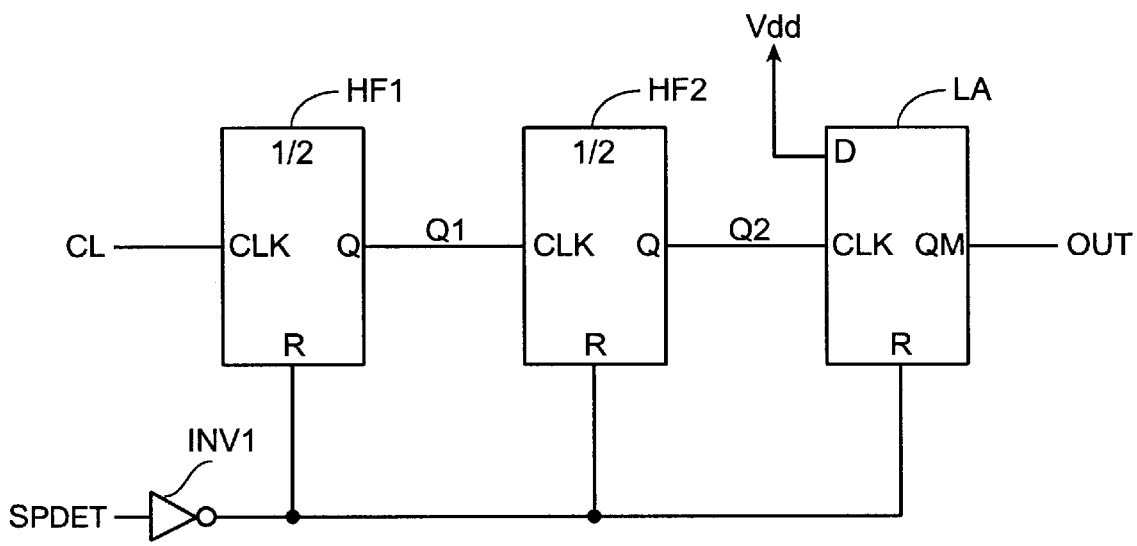
FIG._17a
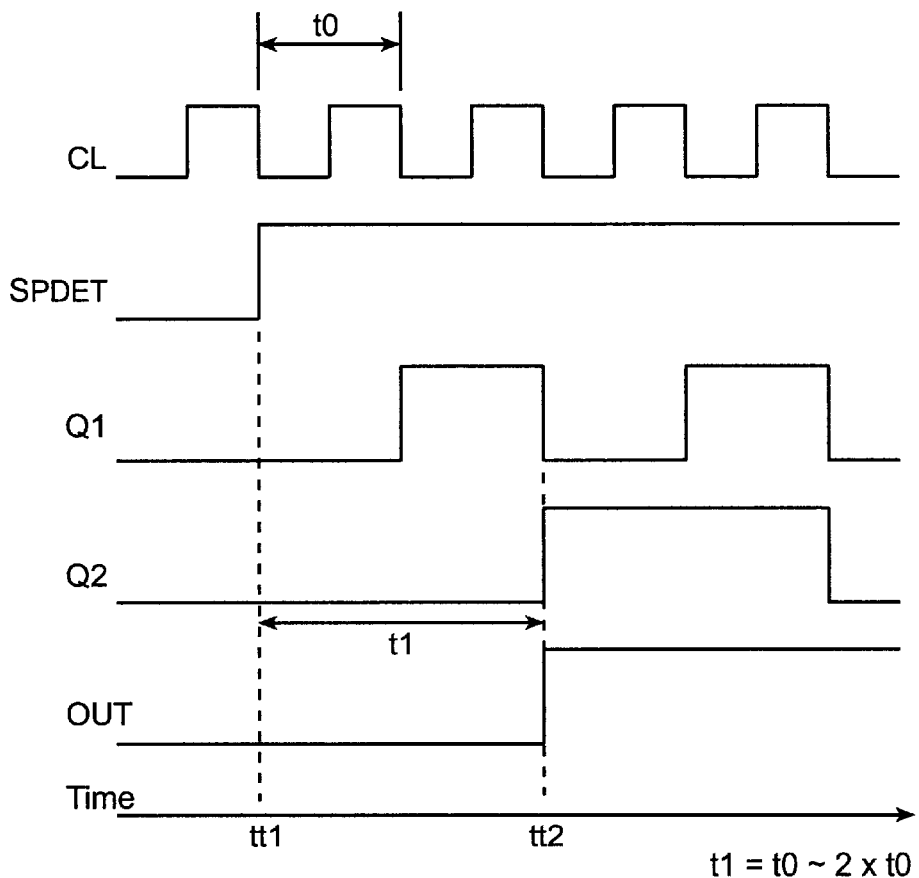
FIG._17b

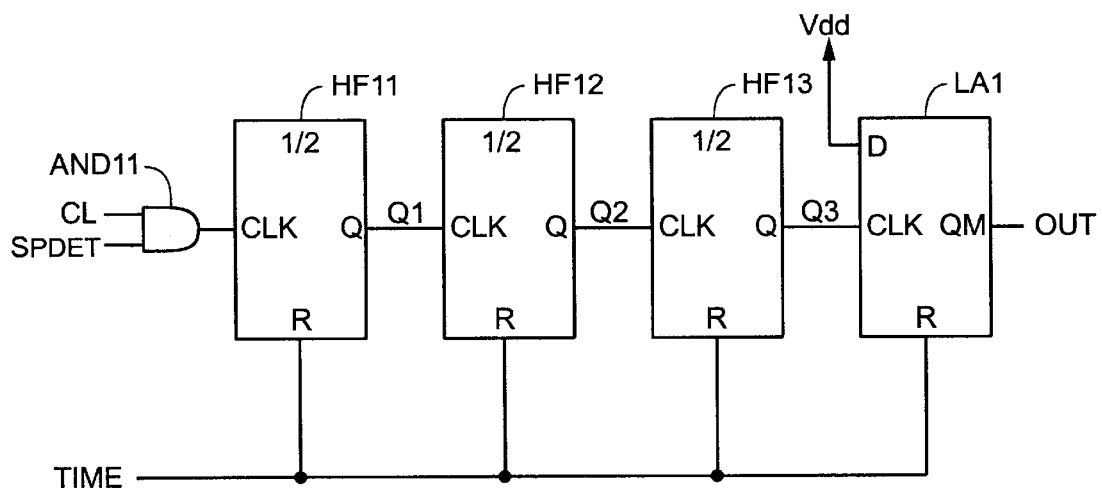
FIG._18a
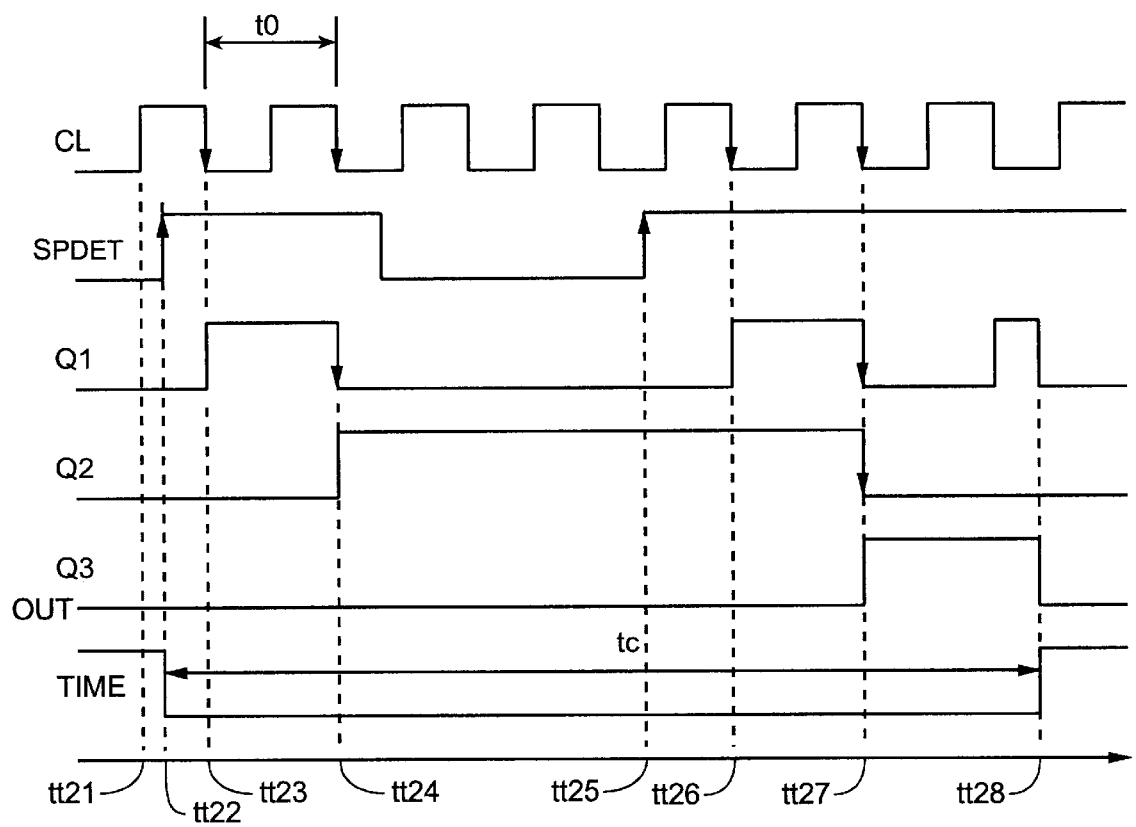
FIG._18b

ELECTRONIC EQUIPMENT AND METHOD OF CONTROLLING ELECTRONIC EQUIPMENT

TECHNICAL FIELD

The present invention relates to an electronic device and a control method for the electronic device and, more particularly, to a technique for detecting the voltages of component units of a portable electronically controlled timepiece incorporating a power generating unit.

BACKGROUND ART

In recent years, small electronic timepieces of a wristwatch type or the like have been implemented that include power generating units, such as solar batteries, so as to obviate the need for replacing batteries. These electronic timepieces are provided with features for temporarily storing electric power, which has been generated by the power generating units, in large-capacitance capacitors or the like. When power generation is not being carried out, time display is performed using the electric power discharged from the capacitor. This feature enables stable operation for an extended period of time without batteries. From the standpoint of cumbersome replacement of batteries or the issue of disposal of the batteries, many electronic timepieces are expected to carry built-in power generating units in the future.

Such an electronic timepiece with a built-in power generating unit is provided with a voltage detecting circuit for detecting a supply voltage in order to prevent the supply voltage of a power unit, which is applied to a time display circuit, from exceeding a breakdown voltage level of the time display circuit, or to carry out various types of control.

An operation of the voltage detecting circuit becomes unstable and a detection error may result if the supply voltage drops below a predetermined operating voltage of the voltage detecting circuit.

A detection error of the voltage detecting circuit may lead to a malfunction of a subsequent control system, resulting in unstable operation of the entire system.

Accordingly, an object of the present invention is to provide an electronic device and a control method for the electronic device that allow prevention of detection errors of a voltage detecting circuit of the electronic device, thereby ensuring stable operation of the entire system.

SUMMARY OF INVENTION

According to a first aspect of the present invention, there is provided a portable electronic device comprising: a power generating unit for generating electric power by converting first energy into second energy, namely, electrical energy; a power unit for storing electrical energy obtained by power generation; a driven unit driven by the electrical energy supplied from the power unit; a power generation detecting unit for detecting whether the power generating unit is generating storable electric power that is sufficient to be stored in the power unit; a stored power voltage detecting unit for detecting a stored power voltage of the power unit; an operating voltage detecting unit for detecting whether the stored power voltage of the power unit has reduced to an operating voltage of the stored power voltage detecting unit or less; and a voltage detection control unit for prohibiting an operation of the stored power voltage detecting unit based on detection results of the operating voltage detecting unit and the power generation detecting unit if the stored power voltage of the power unit has dropped to the operating voltage or less and the generation of storable power is not being carried out.

According to a second aspect of the present invention, there is provided a portable electronic device comprising: an oscillating unit for outputting an oscillation signal having a predetermined frequency; a clock generating unit for generating and issuing a predetermined clock signal based on the oscillation signal; a power generating unit for generating electric power by converting first energy into second energy, namely, electrical energy; a power unit for storing electrical energy obtained by power generation; a driven unit driven by the electrical energy supplied from the power unit; a step-up/down unit for increasing or decreasing a voltage of the electrical energy obtained by power generation based on the clock signal, then supplying the voltage to be stored in the power unit; an oscillation state detecting unit for detecting whether the oscillation unit is at rest; a power generation detecting unit for detecting whether the power generating unit is generating storable electric power that is sufficient to be stored in the power unit; a stored power voltage detecting unit for detecting a stored power voltage of the power unit; and a voltage detection control unit for prohibiting an operation of the stored power voltage detecting unit based on detection results of the oscillation state detecting unit and the power generation detecting unit if the oscillation unit is at rest and the generation of storable power is not being performed, while allowing the stored power voltage detecting unit to operate if the oscillation unit is at rest and storable power is being generated.

According to a third aspect of the present invention, in the first or second aspect of the present invention, the voltage detecting control unit decides that no storable power is being generated unless generation of storable power is continuously detected for a predetermined specified time or more by the power generation detecting unit.

According to a fourth aspect of the present invention, in the first or second aspect of the present invention, the voltage detection control unit decides that no storable power is being generated unless a total time per preset unit time of a time during which the storable power generation is detected by the power generation detecting unit exceeds a preset reference total time.

According to a fifth aspect of the present invention, in the second aspect of the present invention, the power unit comprises a first power unit for storing electrical energy obtained by power generation, and a second power unit for storing electrical energy obtained after the step-up/down unit increases or decreases a voltage of the electrical energy stored in the first power unit, and the stored power voltage detecting unit comprises a first stored power voltage detecting unit for detecting a stored power voltage of the first power unit and a second stored power voltage detecting unit for detecting a stored power voltage of the second power unit.

According to a sixth aspect of the present invention, in the first or second aspect of the present invention, the voltage detection control unit causes the stored power voltage detecting unit to intermittently perform a detecting operation when the stored power voltage detecting unit is in an operable state.

According to a seventh aspect of the present invention, in the first or second aspect of the present invention, the driven unit has a time measuring unit for display time.

According to an eighth aspect of the present invention, in the first or second aspect of the present invention, the voltage detection control unit comprises a timer unit that starts measuring a duration of the generation of storable power when the power generation detecting unit detects that the generation of storable power sufficient to be stored at the power unit is being performed, and resets the measured duration when the power generation detecting unit detects that the generation of storable power is not being performed, and the voltage detection control unit decides that storable power is being generated when the duration reaches a predetermined specified time or more.

According to a ninth aspect of the present invention, in the first or second aspect of the present invention, the voltage detection control unit comprises a timer unit that adds up power generation detection times during a period in which the power generation detecting unit detects that the generation of power sufficient to be stored in the power unit is being performed, and resets a total value of the power generation detection times at every predetermined specified unit time, and the voltage detection control unit decides that the generation of storable power has been detected only when a total time per unit time of the time in which the generation of storable power is detected exceeds a predetermined specified time (reference total time).

According to a tenth aspect of the present invention, there is provided control for a portable electronic device comprising a power generating unit for generating electric power by converting first energy into second energy, namely, electrical energy, a power unit for storing electrical energy obtained by power generation, and a driven unit driven by the electrical energy supplied from the power unit, the control comprising: a power generation detecting step for detecting whether the power generating unit is generating storable electric power that is sufficient to be stored in the power unit; a stored power voltage detecting step for detecting a stored power voltage of the power unit; an operating voltage detecting step for detecting whether the stored power voltage of the power unit has reduced to an operating voltage of the stored power voltage detecting unit or less; and a voltage detection control step for prohibiting an operation of the stored power voltage detecting unit based on detection results of the operating voltage detecting step and the power generation detecting step if the stored power voltage of the power unit has dropped to the operating voltage or less and the generation of storable power is not being carried out.

According to an eleventh aspect of the present invention, there is provided a control method for a portable electronic device comprising an oscillating unit for outputting an oscillation signal having a predetermined frequency, a clock generating unit for generating and issuing a predetermined clock signal based on the oscillation signal, a power generating unit for generating electric power by converting first energy into second energy, namely, electrical energy, a power unit for storing electrical energy, a driven unit driven by the electrical energy supplied from the power unit, and a step-up/down unit for increasing or decreasing a voltage of the electrical energy obtained by power generation based on the clock signal, then supplying the voltage to be stored in the power unit, the control method comprising: an oscillation state detecting step for detecting whether the oscillation unit is at rest; a power generation detecting step for detecting whether the power generating unit is generating storable electric power that is sufficient to be stored in the power unit; a stored power voltage detecting step for detecting a stored power voltage of the power unit; and a voltage detection control step for prohibiting a stored power voltage detecting operation in the stored power voltage detecting step based on detection results of the oscillation state detecting step and the power generation detecting step if the oscillation unit is at rest and the generation of storable power is not being performed, while allowing the stored power voltage detecting operation in the stored power voltage detecting step to be performed if the oscillation unit is at rest and storable power is being generated.

According to a twelfth aspect of the present invention, in the tenth or eleventh aspect of the present invention, the driven unit has a time measuring unit for displaying time.

BRIEF DESCRIPTION OF THE DRAWINGS

FIG. 1 is a diagram showing a schematic configuration of a timing device in accordance with an embodiment of the present invention.

FIG. 2 is a schematic configuration block diagram of a control unit and its peripheral configuration according to the embodiment.

FIG. 3 is a detailed configuration block diagram showing an essential section of the control unit and its peripheral configuration according to the embodiment.

FIG. 4 is a schematic configuration diagram of a step-up/down circuit.

FIGS. 5a and b show operational explanatory diagrams of the step-up/down circuit.

FIGS. 6a and b show equivalent circuits for triple step-up.

FIGS. 7a and b show equivalent circuits for double step-up.

FIGS. 8a and b show equivalent circuits for 1.5-fold step-up.

FIGS. 9a and b show a circuit configuration and an equivalent circuit for 1-fold step-up.

FIGS. 10a and b show equivalent circuits for ½ step-down.

FIG. 11 is a diagram illustrating an operation of peripheral components round the step-up/down circuit.

FIG. 12 is a circuit diagram of a power generation state detecting unit.

FIGS. 13a, b, and c show timing charts for explaining an operation of a first detecting circuit.

FIGS. 14a through f provide timing charts for explaining an operation of a second detecting circuit.

FIGS. 15a and b provide conceptual diagrams for explaining induced voltages and detection signals relative to the induced voltages at different rotational speeds of a power generating rotor.

FIG. 16 is an explanatory diagram of a supply voltage detecting circuit.

FIGS. 17a and b are explanatory diagrams of a configuration example of a timer circuit.

FIGS. 18a and b are explanatory diagrams of another configuration example of a timer circuit.

DETAILED DESCRIPTION

Suitable examples for carrying out the present invention will now be described with reference to the accompanying drawings.

[1] FIRST EMBODIMENT

A first embodiment in accordance with the present invention will be described first.

[1.1] Schematic Configuration of the First Embodiment

FIG. 1 shows a schematic configuration of a timing device 1 in accordance with the first embodiment of the present invention.

The timing device 1 is a wristwatch, and a user wraps a belt connected to a main body of the device around his or her wrist to use it.

The timing device 1 according to the first embodiment is constructed primarily by a power generation unit A that generates AC power, a power unit B that rectifies an AC voltage from the power generating unit A, stores a boosted voltage, and supplies power to components, a control unit 23 that is provided with a power generation state detecting unit 91 (refer to FIG. 2 and FIG. 3) for detecting a power generation state of the power generating unit A, and controls the entire device based on a detection result of the power generation state detecting unit 91, a second hand operating mechanism CS for driving a second hand 55 by using a stepping motor 10, an hour/minute hand operating mechanism CHM for driving a minute hand and an hour hand by using a stepping motor, a second hand driving unit 30S for driving the second hand operating mechanism CS based on a control signal from the control unit 23, an hour/minute hand driving unit 30HM for driving the hour/minute hand operating mechanism CHM based on a control signal from the control unit 23, and an external input device 100 (refer to FIG. 2) for giving an instruction for changing an operation mode of the timing device 1 from a time display mode to a calendar correcting mode, or a time correcting mode, or for forcibly changing to a power saving mode, which will be discussed hereinafter.

The control unit 23 is adapted to switch, according to the power generation state of the power generating unit A, between a display mode (normal operation mode) in which the operating mechanisms CS and CHM are driven to display time, and a power saving mode in which power supply to one or both of the second hand operating mechanism CS and the hour/minute hand operating mechanism CHM is stopped to save power. The power saving mode is forcibly changed to the display mode when the user holds the timing device 1 in his or her hand and shakes it to forcibly generate power so as to cause a predetermined voltage of generated power to be detected.

[1.2] Detailed Configuration

The following will described the individual component units of the timing device 1. The control unit 23 will be discussed later.

[1.2.1] Power Generating Unit

First, the power generating unit A will be described.

The power generating unit A is constituted by a power generating unit 40, an oscillating weight 45, and an accelerating gear 46.

For the power generating unit 40, an electromagnetic inductive AC power generating device is employed. A power generating rotor 43 rotates in a power generating stator 42, and electric power, induced at a power generating coil 44 connected to the power generating stator 42, can be output externally.

The oscillating weight 45 functions as a means for transmitting kinetic energy to the power generating rotor 43. The motion of the oscillating weight 45 is transmitted to the power generating rotor 43 via the accelerating gear 46.

The oscillating weight 45 is adapted to react to a movement of a user's arm or the like and able to swing in the wristwatch type timing device 1. Thus, energy involved in user activities in his or her daily life is utilized to generate power, and the generated power is used to drive the timing device 1.

[1.2.2] Power Unit

The power unit B will now be described.

The power unit B is provided with a limiter circuit LM for preventing an excess voltage from being applied to a circuit in a subsequent stage, a diode 47 serving as a rectifying circuit, a high-capacity secondary power source 48, a step-up/down circuit 49, and an auxiliary capacitor 80.

The step-up/down circuit 49 uses a plurality of capacitors 49a and 49b so as to be able to increase or decrease a voltage in multiple steps.

Power that has been increased or decreased by the step-up/down circuit 49 is stored in the auxiliary capacitor 80.

In this case, based on a control signal φ11 from the control unit 23, the step-up/down circuit 49 is capable of adjusting the voltages supplied to the auxiliary capacitor 80 and also the voltages supplied to the second hand driving unit 30S and the hour/minute hand driving unit 30HM.

The power unit B takes Vdd (high voltage end) as a reference voltage (GND), and produces Vss (low voltage end) as a supply voltage.

The limiter circuit LM will now be described.

The limiter circuit LM equivalently functions as a switch for short-circuiting the power unit A, and is turned ON (closed) when a voltage VGEN of generated power at the power unit A exceeds a predetermined specified limit reference voltage VLM.

As a result, the power unit A is electrically disconnected from the high-capacity secondary power source 48.

Thus, no excessive voltage VGEN of generated power is applied to the high-capacity secondary power source 48, making it possible to prevent damage to the high-capacity secondary power source 48, and damage to the timing device 1, caused by application of the voltage VGEN of generated power that exceeds the breakdown voltage of the high-capacity secondary power source.

[1.2.2.1] Step-up/down Circuit

The step-up/down circuit 49 will now be described with reference to FIG. 4 through FIG. 10.

Referring to FIG. 4, the step-up/down circuit 49 is constituted by a switch SW1 having one terminal thereof connected to a high-potential end terminal of the high-capacity secondary power source 48, a switch SW2 having one terminal thereof connected to the other terminal of the switch SW1 and the other terminal thereof connected to a low-potential end terminal of the high-capacity secondary power source 48, a capacitor 49a having one terminal thereof connected to a junction point of the switch SW1 and the switch SW2, a switch SW3 having one terminal thereof connected to the other terminal of the capacitor 49a and the other terminal thereof connected to a low potential end terminal of the high-capacity secondary power source 48, a switch SW4 having one terminal thereof connected to a low potential end terminal of the auxiliary capacitor 80 and the other terminal thereof connected to a junction point of the capacitor 49a and the switch SW3, a switch SW1 having one terminal thereof connected to a junction point of the high potential end terminal of the high-capacity secondary power source 48 and the high potential end terminal of the auxiliary capacitor 80, a switch SW12 having one terminal thereof connected to the other terminal of the switch SW11 and the other terminal thereof connected to the low potential end terminal of the high-capacity secondary power source 48, a capacitor 49b having one terminal thereof connected to a junction point of the switch SW11 and the switch SW12, a switch SW13 having one terminal thereof connected to the other terminal of the capacitor 49b and the other terminal thereof connected to a junction point of the switch SW12 and the low potential end terminal of the high-capacity secondary power source 48, a switch SW14 having one terminal thereof connected to a junction point of the capacitor 49b and the switch SW13 and the other terminal thereof connected to a low potential end terminal of the auxiliary capacitor, and a switch SW21 having one terminal thereof connected to a junction point of the switch SW11 and the SW12 and the other terminal thereof connected to a junction point of the capacitor 49a and the switch SW3.

[1.2.2.2] Operation of the Step-up/down Circuit

Referring to FIG. 5 through FIG. 10, an outline of the operation of the step-up/down circuit will be described, taking cases of triple step-up, double step-up, 1.5-fold step-up, 1-fold step-up, and ½ step-down as examples.

[1.2.2.2.1] Triple Step-up

The step-up/down circuit 49 operates based on a step-up/down clock CKUD produced by a limiter & step-up/down control circuit 105 (refer to FIG. 3) based on a clock signal CK from a clock generating circuit 104 (refer to FIG. 3). In a triple step-up mode, at a first step-up/down clock timing (parallel connection timing), the switch SW1 is turned ON, the switch SW2 is turned OFF, the switch SW3 is turned ON, the switch SW4 is turned OFF, the switch SW11 is turned ON, the switch SW12 is turned OFF, the switch SW13 is turned ON, the switch SW14 is turned OFF, and the switch SW21 is turned OFF, as shown in FIG. 5(*a*).

An equivalent circuit of the step-up/down circuit 49 in this case will be as shown in FIG. 6(*a*). Power is supplied from the high-capacity secondary power source 48 to the capacitor 49a and the capacitor 49b, and the charging is continued until the voltages of the capacitor 49a and the capacitor 49b become substantially equal to the voltage of the high-capacity secondary power source 48.

Then, at a second step-up/down clock timing (serial connection timing), the switch SW1 is turned OFF, the switch SW2 is turned ON, the switch SW3 is turned OFF, the switch SW4 is turned OFF, the switch SW11 is turned OFF, the switch SW12 is turned OFF, the switch SW13 is turned OFF, the switch SW14 is turned ON, and the switch SW21 is turned ON.

An equivalent circuit of the step-up/down circuit 49 in this case will be as shown in FIG. 6(*b*). The high-capacity secondary power source 48, the capacitor 49a, and the capacitor 49b are serially connected, and the auxiliary capacitor 80 is charged at a voltage that is three times the voltage of the high-capacity secondary power source 48, thus implementing the triple step-up.

[1.2.2.2.2] Double Step-up

The step-up/down circuit 49 operates based on the step-up/down clock CKUD produced by the limiter & step-up/down control circuit 105 (refer to FIG. 3) based on the clock signal CK from the clock generating circuit 104 (refer to FIG. 3). In a double step-up mode, at the first step-up/down clock timing (parallel connection timing), the switch SW1 is turned ON, the switch SW2 is turned OFF, the switch SW3 is turned ON, the switch SW4 is turned OFF, the switch SW11 is turned ON, the switch SW12 is turned OFF, the switch SW13 is turned ON, the switch SW14 is turned OFF, and the switch SW21 is turned OFF, as shown in FIG. 5(*a*).

An equivalent circuit of the step-up/down circuit 49 in this case will be as shown in FIG. 7(*a*). Power is supplied from the high-capacity secondary power source 48 to the capacitor 49a and the capacitor 49b, and the charging is continued until the voltages of the capacitor 49a and the capacitor 49b become substantially equal to the voltage of the high-capacity secondary power source 48.

Then, at the second step-up/down clock timing (serial connection timing), the switch SW1 is turned OFF, the switch SW2 is turned ON, the switch SW3 is turned OFF, the switch SW4 is turned ON, the switch SW11 is turned OFF, the switch SW12 is turned ON, the switch SW13 is turned OFF, the switch SW14 is turned ON, and the switch SW21 is turned OFF.

An equivalent circuit of the step-up/down circuit 48 in this case will be as shown in FIG. 7(*b*). The high-capacity secondary power source 49 is serially connected to the capacitor 49a and the capacitor 49b connected in parallel, and the auxiliary capacitor 80 is charged at a voltage that is double the voltage of the high-capacity secondary power source 48, thus implementing the double step-up.

[1.2.2.2.3] 1.5-fold Step-up

The step-up/down circuit 49 operates based on the step-up/down clock CKUD produced by the limiter & step-up/down control circuit 105 (refer to FIG. 3) based on the clock signal CK from the clock generating circuit 104 (refer to FIG. 3). In a 1.5-fold step-up mode, at the first step-up/down clock timing (parallel connection timing), the switch SW1 is turned ON, the switch SW2 is turned OFF, the switch SW3 is turned OFF, the switch SW4 is turned OFF, the switch SW11 is turned OFF, the switch SW12 is turned OFF, the switch SW13 is turned ON, the switch SW14 is turned OFF, and the switch SW21 is turned ON, as shown in FIG. 5(*a*).

An equivalent circuit of the step-up/down circuit 49 in this case will be as shown in FIG. 8(*a*). Power is supplied from the high-capacity secondary power source 48 to the capacitor 49a and the capacitor 49b, and the charging is continued until the voltages of the capacitor 49a and the capacitor 49b become substantially equal to half the voltage of the high-capacity secondary power source 48.

Then, at the second step-up/down clock timing (serial connection timing), the switch SW1 is turned OFF, the switch SW2 is turned ON, the switch SW3 is turned OFF, the switch SW4 is turned ON, the switch SW11 is turned OFF, the switch SW12 is turned ON, the switch SW13 is turned OFF, the switch SW14 is turned ON, and the switch SW21 is turned OFF.

An equivalent circuit of the step-up/down circuit 49 in this case will be as shown in FIG. 8(*b*). The high-capacity secondary power source 49 is serially connected to the capacitor 49a and the capacitor 49b connected in parallel, and the auxiliary capacitor 80 is charged at a voltage that is 1.5 times the voltage of the high-capacity secondary power source 48, thus implementing the 1.5-fold step-up.

[1.2.2.2.4] 1-fold Step-up (Non-step-up/down Mode: Short-circuit Mode)

In a 1-fold step-up mode, the step-up/down circuit 49 always turns the switch SW1 OFF, the switch SW2 ON, the switch SW3 ON, the switch SW4 ON, the switch SW11 OFF, the switch SW12 ON, the switch SW13 ON, the switch SW14 ON, and the switch SW21 OFF, as shown in FIG. 5(*a*).

The connection of the step-up/down circuit 49 in this case will be as shown in FIG. 9(*a*), and its equivalent circuit will be as shown in FIG. 9(*b*), the high-capacity secondary power source 48 being directly connected to the auxiliary capacitor 80.

[1.2.2.2.5] ½ Step-down

The step-up/down circuit 49 operates based on the step-up/down clock CKUD produced by the limiter & step-up/down control circuit 105 (refer to FIG. 3) based-on the clock signal CK from the clock generating circuit 104 (refer to FIG. 3). In a ½ step-down mode, at a first step-up/down clock timing (parallel connection timing), the switch SW1 is turned ON, the switch SW2 is turned OFF, the switch SW3 is turned OFF, the switch SW4 is turned OFF, the switch SW11 is turned OFF, the switch SW12 is turned OFF, the switch SW13 is turned ON, the switch SW14 is turned OFF, and the switch SW21 is turned ON, as shown in FIG. 5.(a).

An equivalent circuit of the step-up/down circuit 49 in this case will be as shown in FIG. 10(a). Power is supplied from the high-capacity secondary power source 48, with the capacitor 49a and the capacitor 49b connected in series, and the charging is continued until the voltages of the capacitor 49a and the capacitor 49b become substantially equal to half the voltage of the high-capacity secondary power source 48.

Then, at the second step-up/down clock timing (serial connection timing), the switch SW1 is turned ON, the switch SW2 is turned OFF, the switch SW3 is turned OFF, the switch SW4 is turned ON, the switch SW11 is turned ON, the switch SW12 is turned OFF, the switch SW13 is turned OFF, the switch SW14 is turned ON, and the switch SW21 is turned OFF.

An equivalent circuit of the step-up/down circuit 49 in this case will be as shown in FIG. 108(b). The capacitor 49a and the capacitor 49b are connected in parallel, and the auxiliary capacitor 80 is charged at a voltage that is half the voltage of the high-capacity secondary power source 48, thus implementing the ½ step-down.

[1.2.2.3] Operation of a Periphery of Step-up/down Circuit

Referring now to FIG. 11, an operation of a periphery of the step-up/down circuit 49 will be described.

It is assumed that, in an initial state, a power generation state detecting circuit 91 is in operation, a limiter circuit LM is in non-operation, the step-up/down circuit 49 is in non-operation, a limiter ON voltage detecting circuit 92A is in non-operation, a pre-voltage detecting circuit 92B is in non-operation, and the supply voltage detecting circuit 92C is in operation.

It is also assumed that, in the initial state, the voltage of the high-capacity secondary power source 48 is below 0.45 [V].

It is also assumed that a lowest voltage for driving the hand operating mechanisms CS and CHM is set to a value below 1.2 [V].

[1.2.2.3.1] Rise in Voltage of High-capacity Secondary Power Source

[1.2.2.3.1.1] for 0.0 to 0.62 [V]

When the voltage of the high-capacity secondary power source is below 0.45 [V], the step-up/down circuit 49 is in a non-operation state, and a supply voltage detected by the supply voltage detecting circuit 92C is also below 0.45 [E]. Therefore, the hand operating mechanisms CS and CHM remain in a non-drive state.

Thereafter, when power generation of the power generating unit 40 is detected by the power generation state detecting circuit 91, the pre-voltage detecting circuit 92B is actuated.

When the voltage of the high-capacity secondary power source exceeds 0.45 [V], the limiter & step-up/down control circuit 105 carries out control to cause the step-up/down circuit 49 to perform a triple step-up operation based on a supply voltage detection signal SPW of the supply voltage detecting circuit 92C.

Thus, the step-up/down circuit 49 performs a triple step-up operation, and the triple step-up operation is continued by the limiter & step-up/down control circuit 105 until the voltage of the high-capacity secondary power source reaches 0.62 [V].

As a result, the charge voltage of the auxiliary capacitor 80 reaches 1.35 [V] or more, and the hand operating mechanisms CS and CHM are placed in a drive state.

In this case, depending on the power generation state, if the timing device is suddenly swung, for example, the voltage may suddenly rise and exceed an absolute rated voltage or the like. For this reason, more stable operating voltages can be supplied by controlling the step-up/down multiplication ratio to double, 1.5-fold step-up and so on according to the power generation state, rather than directly shifting to the triple step-up operation. The same applies to the following cases.

[1.2.2.3.1.2] for 0.62 [V]to 0.83 [V]

When the voltage of the high-capacity secondary power source exceeds 0.62 [V], the limiter & step-up/down control circuit 105 carries out control to cause the step-up/down circuit 49 to perform a double step-up operation based on a supply voltage detection signal SPW of the supply voltage detecting circuit 92C.

Thus, the step-up/down circuit 49 performs the double step-up operation, and the double step-up operation is continued by the limiter & step-up/down control circuit 105 until the voltage of the high-capacity secondary power source reaches 0.83 [V].

As a result, the charge voltage of the auxiliary capacitor 80 reaches 1.24 [V]or more, and the hand operating mechanisms CS and CHM remain in the drive state.

[1.2.2.3.1.3] for 0.83 [V] to 1.23 [V]

When the voltage of the high-capacity secondary power source exceeds 0.83 [V], the limiter & step-up/down control circuit 105 carries out control to cause the step-up/down circuit 49 to perform a 1.5-fold step-up operation based on a supply voltage detection signal SPW of the supply voltage detecting circuit 92C.

Thus, the step-up/down circuit 49 performs the 1.5-fold step-up operation, and the 1.5-fold step-up operation is continued by the limiter & step-up/down control circuit 105 until the voltage of the high-capacity secondary power source reaches 1.23 [V].

As a result, the charge voltage of the auxiliary capacitor 80 reaches 1.24 [V] or more, and the hand operating mechanisms CS and CHM remain in the drive state.

[1.2.2.3.1.4] for 1.23 [V] or More

When the voltage of the high-capacity secondary power source exceeds 1.23 [V], the limiter & step-up/down control circuit 105 carries out control to cause the step-up/down circuit 49 to eventually perform a 1-fold step-up operation (short circuit mode), that is, a non-step-up operation, based on a supply voltage detection signal SPW of the supply voltage detecting circuit 92C.

To be more specific, first, the step-up/down circuit 49 repeats a charging cycle and a charge transfer cycle alternately in a charge transfer mode, based on a step-up/down clock CKUD produced by the limiter & step-up/down control circuit 105 (refer to FIG. 3) based on the clock signal CK from the clock generating circuit 104 (refer to FIG. 3).

Then, during the charging cycle, at the first step-up/down clock timing (parallel connection timing), the switch SW1 is turned ON, the switch SW2 is turned OFF, the switch SW3 is turned ON, the switch SW4 is turned OFF, the switch SW11 is turned ON, the switch SW12 is turned OFF, the switch SW13 is turned ON, the switch SW14 is turned OFF, and the switch SW21 is turned OFF, as shown in FIG. 5(b). The capacitor 49a and the capacitor 49b are connected in parallel to the high-capacity secondary power source 48, and the capacitor 49a and the capacitor 49b are charged at the voltage of the high-capacity secondary power source 48.

Then, during the charge transfer cycle, at the second step-up/down clock timing (serial connection timing), the switch SW1 is turned ON, the switch SW2 is turned OFF, the switch SW3 is turned OFF, the switch SW4 is turned ON, the switch SW11 is turned ON, the switch SW12 is turned OFF, the switch SW13 is turned OFF, the switch SW14 is turned ON, and the switch SW21 is turned OFF, as shown in FIG. 5(b). Thus, the capacitor 49a and the capacitor 49b are connected in parallel to the auxiliary capacitor 80, and the auxiliary capacitor 80 is charged at the voltage of the capacitor 49a and the capacitor 49b, that is, the voltage of the high-capacity secondary power source 48, thereby implementing the charge transfer.

Thereafter, as the auxiliary capacitor is charged and the operation mode is shifted to the short circuit mode when a voltage level is reached at which less fluctuation in the supply voltage is anticipated to occur after shifting to the short circuit mode.

Thus, the step-up/down circuit 49 carries out the 1-fold step-up operation (short circuit mode), and the 1-fold step-up operation is continued by the limiter & step-up/down control circuit 105 until the voltage of the high-capacity secondary power source 48 drops to a value below 1.23 [V].

As a result, the charge voltage of the auxiliary capacitor 80 reaches 1.23 [V] or more, and the hand operating mechanisms CS and CHM remain in the drive state.

Thereafter, when the pre-voltage detecting circuit 92B causes the voltage of the high-capacity secondary power source 48 to exceed a pre-voltage VPRE (2.3 [V] in FIG. 11), the pre-voltage detecting circuit 92B outputs a limiter operation enable signal SLMEN to the limiter ON voltage detecting circuit 92A. The limiter ON voltage detecting circuit 92A shifts to an operation state and detects whether the limiter circuit LM should be placed in the operation state by performing comparison based on a charge voltage VC of the high-capacity secondary power source 48, a preset limiter ON reference voltage VLMON, and a predetermined sampling interval.

In this case, the power generating unit A intermittently carries out power generation. If a cycle of the power generation is determined to be an interval of a first cycle or more, then the limiter ON voltage detecting circuit 92A performs detection at a sampling interval having a second cycle that is not more than the first cycle.

When the charge voltage VC of the high-capacity secondary power source 48 exceeds 2.5 [V], a limiter ON signal SLMON is output to the limiter circuit LM so as to place the limiter circuit LM in an ON state.

As a result, the limiter circuit LM electrically disconnects the power generating unit A from the high-capacity secondary power source 48.

This prevents an excessive generated power voltage VGEN from being applied to the high-capacity secondary power source 48. Hence, it is possible to prevent damage to the high-capacity secondary power source 48 and damage to the timing device 1 caused by application of a voltage that exceeds the breakdown voltage of the high-capacity secondary power source.

Thereafter, when power generation is no longer detected by the power generation detecting unit 91 and a power generation state detection signal SPDET is no longer output from the power generation state detecting unit 91, the limiter circuit LM is switched to an OFF state regardless of the charge voltage VC of the high-capacity secondary power source 48, and the limiter ON voltage detecting circuit 92A, the pre-voltage detecting circuit 92B, and the supply voltage detecting circuit 92C are placed in the non-operation state.

[1.2.2.3.1.5] Processing for Increasing step-up Multiplication Ratio

When the voltage of the high-capacity secondary power source 48 is being increased by the step-up/down circuit 49, with the limiter circuit LM ON, it is necessary to decrease a step-up multiplication ratio or to stop a step-up operation for securing safety.

More generally, based on a detection result in the limiter ON voltage detecting circuit 92A, if the generated power voltage in the power generating unit 40 reaches a preset limiter ON voltage or more and the power source step-up/down circuit 49 is performing step-up, then a step-up multiplication ratio N may be set to a step-up multiplication ratio N' (N' is a real number and 1<N'<N).

This setting is made to securely prevent damage attributable mainly to the application of a voltage exceeding an absolute rated voltage due to a step-up when a sudden increase in voltage is assumed as in a case where a non-power-generation state is switched to a power generation state.

[1.2.2.3.2] Drop in Voltage of High-capacity Secondary Power Source

[1.2.2.3.2.1] for 1.20 [V] or More

In a state wherein the charge voltage VC of the high-capacity secondary power source 48 exceeds 2.5 [V], the limiter ON signal SLMON has been output to the limiter circuit LM, so that the limiter circuit LM is ON, and the limiter circuit LM has the power generating unit A electrically disconnected from the high-capacity secondary power source 48.

In this state, the limiter ON voltage detecting circuit 92A, the pre-voltage detecting circuit 92B, and the supply voltage detecting circuit 92C are all in the operation state.

Thereafter, when the charge voltage VC of the high-capacity secondary power source 48 drops below 2.5 [V], the limiter ON voltage detecting circuit 92A stops outputting the limiter operation enable signal SLMEN to the limiter circuit LM, so that the limiter circuit LM is set to the OFF state.

When the charge voltage VC of the high-capacity secondary power source 48 further drops below 2.3 [V], the pre-voltage detecting circuit 92B stops outputting the limiter operation enable signal SLMEN to the limiter ON voltage detecting circuit 92A, so that the limiter ON voltage detecting circuit 92A is switched to the non-operation state, and the limiter circuit LM is set to the OFF state.

In the above normalization, the limiter & step-up/down control circuit 105 carries out control to cause the step-up/down circuit 49 to perform the 1-fold step-up operation, that is, the non-step-up operation, based on the supply voltage detection signal SPW of the supply voltage detecting circuit 92C, and the hand operating mechanisms CS and CHM still continue to be in the drive state.

[1.2.2.3.2.2] for 1.20 [V] to 0.80 [V]

When the voltage of the high-capacity secondary power source drops to a level below 1.23 [V], the limiter & step-up/down control circuit 105 carries out control to cause the step-up/down circuit 49 to perform the 1.5-fold step-up operation based on a supply voltage detection signal SPW of the supply voltage detecting circuit 92C.

Thus, the step-up/down circuit 49 performs the 1.5-fold step-up operation, and the 1.5-fold step-up operation is continued by the limiter & step-up/down control circuit 105 until the voltage of the high-capacity secondary power source reaches 0.80 [V].

As a result, the charge voltage of the auxiliary capacitor 80 reaches a level at 1.2 [V] or more and below 1.8 [V], and the hand operating mechanisms CS and CHM still continue to be in the drive state.

[1.2.2.3.2.3] for 0.80 [V] to 0.60 [V]

When the voltage of the high-capacity secondary power source drops below 0.80 [V], the limiter & step-up/down control circuit 105 carries out control to cause the step-up/down circuit 49 to perform the double step-up operation based on a supply voltage detection signal SPW of the supply voltage detecting circuit 92C.

Thus, the step-up/down circuit 49 performs the double step-up operation, and the double step-up operation is continued by the limiter & step-up/down control circuit 105 until the voltage of the high-capacity secondary power source reaches 0.60 [V].

As a result, the charge voltage of the auxiliary capacitor 80 reaches a level of 1.20 [V] or more and below 1.6 [V], and the hand operating mechanisms CS and CHM still continue to be in the drive state.

[1.2.2.3.2.4] for 0.6 [V] to 0.45 [V]

When the voltage of the high-capacity secondary power source drops below 0.6 [V], the limiter & step-up/down control circuit 105 carries out control to cause the step-up/down circuit 49 to perform the triple step-up operation based on a supply voltage detection signal SPW of the supply voltage detecting circuit 92C.

Thus, the step-up/down circuit 49 performs the triple step-up operation, and the triple step-up operation is continued by the limiter & step-up/down control circuit 105 until the voltage of the high-capacity secondary power source reaches 0.45 [V].

As a result, the charge voltage of the auxiliary capacitor 80 reaches a level of 1.35 [V] or more and below 1.8 [V], and the hand operating mechanisms CS and CHM are placed in the drive state.

[1.2.2.3.2.5] for below 0.45 [V]

When the voltage of the high-capacity secondary power source 48 drops below 0.45 [V], the step-up/down circuit 49 is placed in the non-operation state, the hand operating mechanisms CS and CHM are placed in the non-drive state, and only charging of the high-capacity secondary power source 48 is carried out.

Thus, wasteful power consumption involved in step-up can be reduced, and the time required for the hand operating mechanisms CS and CHM to be re-driven can be shortened.

[1.2.2.3.2.6] Processing for Decreasing Step-up Multiplication Ratio

It is necessary to not decrease a step-up multiplication ratio again until a period of time has passed that is sufficient for an actual charge voltage Vc to be stabilized after a preceding decrease of the step-up multiplication ratio (e.g. from double to 1.5-fold).

This is because, even when the step-up multiplication ratio is decreased, the actual voltage following a step-up gradually approaches a voltage of the decreased step-up multiplication ratio rather than instantly changing. Hence, the step-up multiplication ratio will become excessively low.

More generally, it is determined whether a predetermined specified multiplication ratio change prohibition time has passed from the moment when the step-up multiplication ratio N (N is a real number) was changed to the step-up multiplication ratio N' (N' is a real number and $1 \leq N' < N$), and changing the step-up multiplication ratio may be prohibited until the predetermined specified multiplication ratio change prohibition time passes from the moment when the previous step-up multiplication ratio N was changed to the above step-up multiplication ratio N'.

[1.2.3] Hand Operating Mechanisms

The hand operating mechanisms CS and CHM will now be described.

[1.2.3.1] Second Hand Operating Mechanism

First, the second hand operating mechanism CS will be described.

A stepping motor 10 used in the second hand operating mechanism CS is a motor which is referred to as a pulse motor, a stepping motor, an incremental movement motor, or a digital motor frequently used as an actuator of a digitally controlled device, and driven by pulse signals. In recent years, compact, light-weight stepping motors are in widespread use as actuators for small electronic devices or information equipment suited for carrying. Such electronic devices are typically represented by timing devices, including electronic timepieces, time switches, and chronographs.

The stepping motor 10 in this embodiment is provided with a drive coil 11 that generates magnetic forces by drive pulses supplied from a second hand driving unit 30S, a stator 12 excited by the drive coil 11, and a rotor 13 that rotates by a magnetic field excited in the stator 12.

The stepping motor 10 is formed of a PM type (permanent magnet rotating type) in which the rotor 13 is constituted by a disc-shaped, bipolar permanent magnet.

The stator 12 is provided with a magnetic saturation section 17 so that different magnetic poles are produced in phases (poles) 15 and 16 around the rotor 13 by magnetic forces generated by the drive coil 11.

To set a direction of rotation of the rotor 13, an inner notch 18 is provided at an appropriate position on an inner periphery of the stator 12. A cogging torque is generated to stop the rotor 13 at an appropriate position.

The rotation of the rotor 13 of the stepping motor 10 is transmitted to a second hand 53 by a train wheel 50 composed of a second intermediate wheel 51 and a second wheel (second indicator) 52 meshed with the rotor 13 via a pinion, thereby performing second display.

[1.2.3.2] Hour/minute Hand Operating Mechanism

The hour/minute hand operating mechanism CHM will now be described.

The stepping motor 60 used in the hour/minute hand operating mechanism CHM has the same construction as that of the stepping motor 10.

A stepping motor 60 used in this embodiment is provided with a drive coil 61 that generates magnetic forces by drive pulses supplied from a hour/minute driving unit 30HM, a stator 62 excited by the drive coil 61, and a rotor 63 that rotates by a magnetic field excited in the stator 62.

The stepping motor 60 is formed of a PM type (permanent magnet rotating type) in which the rotor 63 is constituted by a disc-shaped, bipolar permanent magnet. The stator 62 is provided with a magnetic saturation section 67 so that opposite magnetic poles are produced at phases (poles) 65 and 66 around the rotor 63 by magnetic forces generated by the drive coil 61. Furthermore, to define a direction of rotation of the rotor 63, an inner notch 68 is provided at an appropriate position on an inner periphery of the stator 62. A cogging torque is generated to stop the rotor 63 at an appropriate position.

The rotation of the rotor 63 of the stepping motor 60 is transmitted to each hand by a train wheel 70 composed of a fourth wheel 71, a third wheel 72, a center wheel (minute indicator) 73, a minute wheel 74, and an hour wheel (hour indicator) 75 meshed with the rotor 63 via a pinion. A minute hand 76 is connected to the center wheel 73, and an hour hand 77 is connected to the hour wheel 75. As the rotor 63 rotates, hour and minute are display by these hands.

Although not shown, it is obviously possible to further connect a transmission system for displaying year, month, and day (calendar) or the like (e.g. a hour intermediate wheel, an intermediate data wheel, a date indicator driving wheel, a date indicator, etc. for displaying dates) to the train wheel 70. In this case, it is further possible to provide a calendar correction system train wheel (e.g. a first calendar correction transmitting wheel, a second calendar correction transmitting wheel, a calendar correction wheel, a date indicator, etc.).

[1.2.4] Second Hand Driving Unit and Hour/minute Hand Driving Unit

The second hand driving unit 30S and the hour/minute hand driving unit 30HM will now be described. In this case, the second hand driving unit 30S and the hour/minute hand driving unit 30HM share the same construction; hence, the descriptions will be given only of the second hand driving unit 30S.

The second hand driving unit 30S supplies a variety of driving pulses to the stepping motor 10 under the control of the control unit 23.

The second hand driving unit 30S is equipped with a bridge circuit constituted by a p-channel MOS 33a and an n-channel MOS 32a, and a p-channel MOS 33b and an n-channel MOS 32b connected in series.

The second driving unit 30S is further equipped with a rotation detecting resistors 35a and 35b connected in parallel to the p-channel MOS's 33a and 33b, respectively, and sampling p-channel MOS's 34a and 34b for supplying chopper pulses to these resistors 35a and 35b. Therefore, control pulses of different polarities and pulse widths are applied at different timings to the gate electrodes of these MOS's 32a, 32b, 33a, 33b, 34a, and 34b from the control unit 23 so as to supply driving pulses of different polarities or detecting pulses for generating an inductive voltage for detecting rotation of the rotor 13 and detecting a magnetic field to the drive coil 11.

[1.2.5] Control Circuit

A configuration of the control circuit 23 will now be described with reference to FIG. 2 and FIG. 3.

FIG. 2 is a block diagram showing a schematic configuration of the control circuit 23 and its peripherals (including a power unit), and FIG. 3 is a block diagram showing a configuration of an essential section thereof.

The control circuit 23 is equipped primarily with a pulse synthesizing circuit 22, a mode setting unit 90, a time information storage unit 96, and a drive control circuit 24.

First, the pulse synthesizing circuit 22 is constituted by an oscillating circuit that uses a reference oscillating source 21, such as a crystal oscillator, to produce a reference pulse of a stable frequency, and a synthesizing circuit that synthesizes a divided frequency, which has been obtained by dividing the reference pulse, and the reference pulse to produce pulse signals having different pulse widths and timings.

Next, the mode setting unit 90 is constituted by the power generation state detecting unit 91, a voltage detecting circuit 92 for detecting the charge voltage Vc of the high-capacity secondary power source 48 and an output voltage of the step-up/down circuit 49, a central control circuit 93 that controls a time display mode according to a power generation state and also controls a step-up multiplication ratio based on a charge voltage, and a mode storage unit 94 for storing modes.

The power generation state detecting unit 91 is equipped with a first detecting circuit 97 for comparing the induced voltage Vgen of the power generating unit 40 with the voltage VC of the high-capacity secondary power source 48 so as to determine whether power generation capable of charging the high-capacity secondary power source 48 (hereinafter referred to as "power generation capable of charging") has been detected, and a second detecting circuit 98 for separately detecting whether a duration Tge of the power generation capable of charging has exceeded a set time value To1, or whether a total power generation time per unit time has exceeded a set time value To2, then decides that the power generation state has been engaged, and issues a power generation state detection signal SPDET (1) if a condition of the first detecting circuit 97 is satisfied (the first embodiment), or (2) if conditions of both the first detecting circuit and the second detecting circuit 98 are satisfied (corresponding to a second embodiment to be discussed hereinafter).

The power generation state detecting unit 91 will be described with reference to FIG. 12 through FIG. 15.

[1–3: Power Generation State Detecting Unit]

A configuration of the power generation state detecting unit 91 will be described with reference to the accompanying drawings. FIG. 12 is a circuit diagram of the power generation state detecting unit 91. In FIG. 12, the first detecting circuit 97 generates a voltage detection signal Sv that goes to an "H" level when an amplitude of the induced voltage Vgen exceeds a predetermined voltage, while it goes to an "L" level when the amplitude thereof is below the predetermined voltage. The second detecting circuit 98 generates a power generation duration time detection signal St that goes to the "H" level when the power generation duration time exceeds a predetermined time, while it goes to the "L" level when the power generation duration time is below the predetermined voltage. A logical sum of the voltage detection signal Sv and the power generation duration detection signal St is calculated by an OR circuit 975, and the logical sum is supplied as a power generation state detection signal S to the central control circuit 93. The power generation state detection signal S indicates a power generation state at the "H" level, while it indicates a non-power-generation state at the "L" level. Accordingly, the power generation state detecting unit 91 decides that the power generation state has been engaged if the condition of either the first detecting circuit 97 or the second detecting circuit 98 is satisfied. The following will describe the first detecting circuit 97 and the second detecting circuit 98 in detail.

[1-3-1: First Detecting Circuit]

In FIG. 12, first, the first detecting circuit 97 is formed primarily of a comparator 971, reference voltage sources 972 and 973 for generating constant voltages, the switch SW1, and a retriggerable monostable multivibration 974. A value of a induced voltage of the reference voltage source 972 is set to a set voltage value Va in a display mode, while a value of an induced voltage of the reference voltage source 973 is set to a set voltage value Vb in a power saving mode. The reference voltage sources 972 and 973 are connected to a positive input terminal of the comparator 971 via the switch SW1. The switch SW1 is controlled by a set value changing unit 95. The switch SW1 connects the reference voltage source 972 to the positive input terminal of the comparator 971 in the display mode, while it connects the reference voltage source 973 to the positive input terminal of the comparator 971 in the power saving mode. The induced voltage Vgen of the power generating unit A is supplied to a negative input terminal of the comparator 971. Thus, the comparator 971 compares the induced voltage Vgen with the set voltage value Va or the set voltage value Vb, and produces a comparison result signal that goes to the "H" level if the induced voltage Vgen is smaller than the above set values (if the amplitude is large), while it goes to the "L" level if the induced voltage Vgen exceeds the above set values (if the amplitude is small).

Then, the retriggerable monostable multivibrator 974 is triggered at a rising edge that occurs when the comparison result signal rises from the "L" level to the "H" level, switches from the "L" level to the "H" level, and produces a signal that rises from the "L" level to the "H" level after a predetermined time elapses. The retriggerable monostable multivibrator 974 is adapted to reset a measured time and start new time measurement if it is retriggered before the predetermined time elapses.

An operation of the first detecting circuit 97 will now be described with reference to FIG. 13. FIG. 13 shows timing charts of the first detecting circuit 97. FIG. 13(*a*) shows a waveform of the induced voltage Vgen that has been subjected to half-wave rectification by a diode 47. In this example, it is assumed that the set voltage values Va and Vb are set at the levels shown in the chart. If the current mode is the display mode, then the switch SW1 selects the reference voltage source 972 to supply the set voltage value Va to the comparator 971. Then, the comparator 971 compares the set voltage value Va with the induced voltage Vgen shown in FIG. 13(*a*), and generates a comparison result signal shown in FIG. 13(*b*). In this case, the retriggerable monostable multivibrator 974 rises from the "L" level to the "H" level in synchronization with a rising edge of a comparison result signal appearing at time t1 (refer to FIG. 13(*c*)). Delay time Td of the retriggerable monotable multivibrator 974 is shown in FIG. 13(*b*). In this case, the time from an edge e1 to the following edge e2 is shorter than the delay time Td, so that the voltage detection signal Sv is held at the "H" level.

If the current mode is the display mode, then the switch SW1 selects the reference voltage source 973 to supply the set voltage value Vb to the comparator 971. In this example, the induced voltage Vgen does not exceed the set voltage value Vb; hence, no trigger is applied to the retriggerable monostable multivibrator 974. Thus, the voltage detection signal Sv is held at the "L" level.

As set forth above, the first detecting circuit 97 compares the set voltage value Va or Vb, based on the mode, with the induced voltage Vgen so as to generate the voltage detection signal Sv.

[1-3-2: Second Detecting Circuit]

In FIG. 12, the second detecting circuit 98 is constituted by an integrating circuit 981, a gate 982, a counter 983, a digital comparator 984, and a switch SW2.

First, the integrating circuit 981 is constructed by a MOS transistor 2, a capacitor 3, a pull-up resistor 4, and an inverter circuit 5. The induced voltage Vgen is connected to a gate of the MOS transistor 2, and the MOS transistor 2 is repeatedly turned ON/OFF by the induced voltage Vgen so as to control charging of the capacitor 3. Using a MOS transistor to constitute a switching means makes it possible to construct the integrating circuit 981 by an inexpensive CMOS-IC, including an inverter circuit 5; however, these switching element and the voltage detecting means may be constructed by bipolar transistors. The pull-up resistor 4 functions to fix a voltage value V3 of the capacitor 3 at a potential Vss in a non-power-generation mode, and to produce leakage current in the non-power-generation mode. The resistor has a high resistance value of about a few tens to a few hundreds of megohms (MΩ), and may be constituted using a MOS transistor having high ON resistance. The voltage value V3 of the capacitor 3 is determined by the inverter circuit 5 connected to the capacitor 3. A detection signal Vout is issued. A threshold value of the inverter circuit 5 is set to be a set voltage value Vbas that is considerably smaller than a set voltage value Vo used by the first detecting circuit 97.

A reference signal and the detection signal Vout supplied from the pulse synthesizing circuit 22 are supplied to the gate 982. Hence, the counter 983 counts the reference signals during a period in which the detection signal Vout stays at the "H" level. The count value is supplied to one input of the digital comparator 984. The set time value To corresponding to a set time is supplied to the other input of the digital comparator 984. If the current mode is the display mode, then the set time value Ta is supplied via the switch SW2, and if the current mode is the power saving mode, then the set time value Tb is supplied via the switch SW2. The switch SW2 is controlled by the set value changing unit 95.

The digital comparator 984 outputs its comparison result in the form of the power generation duration detection signal St in synchronization with a falling edge of the detection signal Vout. The power generation duration detection signal St goes to the "H" level if the comparison result exceeds the set time, while it goes to the "L" level if the comparison result is below the set time.

An operation of the second detecting circuit 98 will now be described with reference to FIG. 14. FIG. 14 shows timing charts for explaining the operation of the second detecting circuit 98. When the generation of AC power shown in FIG. 14(*a*) is started by the power generating unit A, the power generating unit 40 generates the induced voltage Vgen, shown in FIG. 14(*b*), via the diode 47. When the power generation is started and the voltage value of the induced voltage Vgen falls from Vdd to Vss, the MOS transistor 2 turns ON and charging of the capacitor 3 begins. A potential of V3 is fixed to Vss by the pull-up resistor 4 in the non-power-generation mode; however, when power generation begins and the charging of the capacitor 3 starts, the potential of V3 begins to rise toward Vdd. Then, when the voltage of the induced voltage Vgen increases to Vss and the MOS transistor 2 turns OFF, the charging into the capacitor 3 stops, but the potential of V3 shown in FIG. 14(*c*) is maintained as it is by the capacitor 3. The operation set forth above is repeated as long as power generation is continued, and the potential of V3 rises to and stabilizes at Vdd. If the potential of V3 rises above the threshold value of the inverter circuit 5, then the detection signal Vout, which is an output of an inverter circuit 5', switches from the "L" level to the "H" level, permitting the detection of power generation. A response time required for detecting the power generation can be arbitrarily set by connecting a current limiting resistor, adjusting a value of charging current to the capacitor 3 by changing the capability of the MOS transistor, or by changing a capacitance value of the capacitor 3.

When power generation is stopped, the induced voltage Vgen stabilizes at the Vdd level, so that the MOS transistor 2 remains OFF. The voltage of V3 is held for a while by the capacitor 3; however, charges leak from the capacitor 3 due to small leakage current caused by the pull-up resistor 4, causing V3 to start gradually falling from Vdd to Vss. The moment V3 exceeds the threshold value of the inverter circuit 5, the detection signal Vout, which is an output of the inverter circuit 5', switches from the "H" level to the "L" level, making it possible to detect that power generation is no longer being performed (refer to FIG. 14(*d*)). The response time can be arbitrarily set by changing the resistance value of the pull-up resistor 4 and by adjusting leakage current of the capacitor 3.

When a reference signal is gated by the detection signal Vout, a signal shown in FIG. 14(*e*) is obtained, and the signal is counted by the counter 983. The count value is compared at a timing T1 by the digital comparator 984 with a value corresponding to a set time. If an "H" level period Tx of the detection signal Vout is longer than the set time value To, then the power generation duration detection signal St changes from the "L" level to the "H" level at the timing T1 as shown in FIG. 14(f).

Descriptions will now be given of the induced voltage Vgen at different rotational speeds of the power generating rotor 43 and the detection signal Vout relative to the induced voltage Vgen. FIG. 15 provides conceptual diagrams for explaining the above. Specifically, FIG. 15(a) illustrates a case where the rotational speed of the power generating rotor 43 is low, and FIG. 15(b) illustrates a case where the rotational speed of the power generating rotor 43 is high. A voltage level and cycle (frequency) of the induced voltage Vgen depend upon the rotational speed of the power generating rotor 43. More specifically, as the rotational speed increases, the amplitude of the electromotive pressure Vgen increases and the cycle becomes shorter. Therefore, the length of an output holding time of the detection signal Vout (the duration of the power generation) depends upon the rotational speed of the power generating rotor 43, that is, a magnitude of the power generation of the power generating unit 40. To be more specific, the output holding time will be ta when the amplitude in FIG. 15(a) is small, while the output holding time will be tb when the amplitude in FIG. 15(b) is large. The magnitude relationship between the two is represented by ta<tb.

Thus, the magnitude of the power generation of the power generating unit 40 can be known from the length of the output holding time of the detection signal Vout.

The central control circuit 93 is equipped with a non-power-generation time measuring circuit 99 for measuring a non-power-generation time Tn during which no power generation is detected by the power generation state detecting unit 91. When the non-power-generation time Tn continues for a predetermined set time or more, the operation mode is switched from the display mode to the power saving mode.

The operation mode is switched from the power saving mode to the display mode if the power generation state detecting unit 91 detects that the power generating unit A is in the power generation state, and if the charge voltage VC of the high-capacity secondary power source 48 is sufficiently high.

In this case, if the limit circuit LM is in an enable state while the operation mode is being shifted to the power saving mode, then the limiter circuit LM will be undesirably turned ON (closed) if the generated power voltage VGEN of the power generating unit A exceeds a predetermined specified limit reference voltage VLM.

As a result, the power generating unit A will be short-circuited, and the power generation state detecting unit 91 will not be able to detect that the power generating unit A is in the power generation state, preventing the operation mode from shifting to the power saving mode or the display mode.

If the operation mode is the power saving mode, then the limiter circuit LM is set to the OFF (open) state regardless of the power generation state of the power generating unit A, allowing the power generation state detecting unit 91 to securely detect the power generation state of the power generating unit A.

As shown in FIG. 3, the voltage detecting circuit 92 is constituted by: a limiter ON voltage detecting circuit 92A that determines whether the limiter circuit LM should be placed in the operation state by comparing the charge voltage VC of the high-capacity secondary power source 48 or a charge voltage VC1 of the auxiliary capacitor 80 with a predetermined limiter ON reference voltage VLMON, and outputs a limiter ON signal SLMON; a pre-voltage detecting circuit 92B that determines whether the limiter ON voltage detecting circuit 92A should be actuated, by comparing the charge voltage VC of the high-capacity secondary power source 48 or the charge voltage VC1 of the auxiliary capacitor 80 with a predetermined limiter circuit operation reference voltage (hereinafter referred to as "pre-voltage") VPRE, and outputs a limiter enable signal SLMEN; and a supply voltage detecting circuit 92C that detects the charge voltage VC of the high-capacity secondary power source 48 or the charge voltage VC1 of the auxiliary capacitor 80 and outputs a supply voltage detection signal SPW.

In this case, the limiter ON voltage detecting circuit 92A employs a circuit configuration capable of performing more accurate voltage detection than the pre-voltage detecting circuit 92B, and has a larger circuit scale than the pre-voltage detecting circuit 92B, consuming more power accordingly.

Referring now to FIG. 16, a configuration example of the supply voltage detecting circuit 92C and its operation outline will be described.

The supply voltage detecting circuit 92C is constituted mainly by a storage/operating voltage detecting unit A01 for detecting a storage voltage or an operating voltage, a voltage detection control unit A02 for controlling a voltage detecting operation in the storage/operation voltage detecting unit, and a timer circuit A03 that outputs a timer signal OUT based on a predetermined clock signal CL.

The storage/operation voltage detecting unit A01 is constituted by a reference voltage changing switch SWP that selectively outputs reference voltage VREF1 to VREFn based on changing control signals T1 to Tn, and a comparator CM1 in which the reference voltages VREF1 to VREFn are selectively supplied to a reverse input terminal, the supplied reference voltages are compared with the charge voltage VC of the high-capacity secondary power source 48 or the charge voltage VC1 of the auxiliary capacitor 80, and a comparison result signal SCMP is output.

The voltage detection control unit A02 is constituted by: an OR circuit OR1 takes a logical sum of the power generation state detection signal SPDET or an output out of the timer circuit and a supply voltage detection signal SPW, and outputs the logical sum; an AND circuit AND1 that takes a logical product of an output of the OR circuit OR1 and a voltage detection timing control signal SCSMP and outputs the logical product as a voltage detection timing signal SSMP; an N-channel MOS transistor TR1 that conducts in response to an "H" level voltage detection timing signal SSMP and places the comparator in a drive state; and an AND circuit AND2 that takes a logical product of the comparison result signal SCMP, which is an output of the comparator CM1, and a voltage detection timing signal SSMP, which is an output of the AND circuit AND1, and outputs the logical product as a supply voltage detection signal SPW.

FIG. 17(a) shows circuit example of the timer circuit A03.

FIG. 17(a) shows a specific example of the timer circuit A03 that causes the storage/operation voltage detection unit A01 to perform intermittent operation when power generation continues for a predetermined time or more.

The timer circuit A03 is constituted by: an inverter INV1 that inverts the power generation state detection signal SPDET and outputs the inverted signal; a ½ frequency divider circuit HF1 in which the clock signal CL is supplied to its clock terminal CLK, a reverse signal of the power generation state detection signal SPDET is supplied to its reset terminal R, and which divides the clock signal CL to a half and outputs the halved signal as a ½ divided signal Q1 from an output terminal Q; a ½ frequency divider circuit HF2 in which the ½ divided signal Q1 is supplied to the clock terminal CLK, and a reverse signal of the power generation state detection signal SPDET is supplied to the reset terminal R, and which divides the ½ divided signal Q1 in half and outputs the halved signal as a ¼ divided signal Q2 from the output terminal Q; and a latching circuit LA in which the ¼ divided signal Q2 is supplied to the clock terminal CLK, and a reverse signal of the power generation state detection signal SPDET is supplied to its reset terminal R, and which holds the timer signal OUT at the "H" level at a rise timing of the ¼ divided signal Q2.

Referring now to the timing chart of FIG. 17(b), the operation will be outlined. The following descriptions will be given of a case where the OR circuit OR1 is connected to the timer circuit A03.

When the power generation state detection signal SPDET switches to the "H" level at time tt1, the ½ frequency divider circuit HF1 of the timer circuit A03 divides the clock signal CL in half and outputs the halved signal as the ½ divided signal Q1 from an output terminal Q.

Accordingly, the ½ frequency divider circuit HF2 also divides the ½ divided signal Q1 in half and outputs the halved signal as the ¼ divided signal Q2 from the output terminal Q.

As a result, at time tt2, when the ¼ divided signal Q2 is switched to the "H" level, the timer signal OUT is shifted to the "H" level. The timer signal OUT is maintained at the "H" level until the reverse signal of the power generation state detection signal SPDET is shifted to the "H" level, that is, the non-power-generation state is engaged.

Meanwhile, when the timer signal OUT is shifted to the "H" level, the output of the OR circuit OR1 is shifted to the "H" level.

Therefore, when the voltage detection timing control signal SCSMP is switched to the "H" level, the voltage detection timing signal SSMP, which is an output of the AND circuit AND1, is switched to the "H" level, causing the N-channel MOS transistor TR1 to conduct.

Thus, the comparator CM1 is placed in the operation state, and the comparator CM1 compares the charge voltage VC of the high-capacity secondary power source 48 or the charge voltage VC1 of the auxiliary capacitor 80 with a reference voltage VREFx (=one of reference voltages VREF1 to VREFn) selectively outputted based on the changing control signals T1 to Tn by the reference voltage changing switch SWP, and outputs a-comparison result signal SCMP of the "H" level to the AND circuit AND2 if $|VC|>VREFx|$ or $|VC|>|VREFx|$ The AND circuit AND2 outputs the supply voltage detection signal SPW of the "H" level if the voltage detection timing signal SSMP is the "H" level and the comparison result signal SCMP is the "H" level, that is, the voltage detection timing, and if $|VC|>|VREFx|$ or $|VC1|>|VREFx|$ FIG. 18(a) shows another circuit example of the timer circuit A03.

FIG. 18(a) shows another specific example of the timer circuit A03 used for a case where it is not regarded that power generation for storage has been detected unless a total time per predetermined unit time during which power generation for storage has been detected exceeds a predetermined specified time (reference total time) in the power generating unit. The following will describe a case where the timer signal OUT is shifted to the "H" level when the total time of power generation detection per a unit time tc is about three to four times a clock cycle.

The timer circuit A03 is constituted by: an AND circuit AND 11 in which the power generation state detection signal SPDET is supplied to one input terminal, and the clock signal CL is supplied to the other input terminal, and which takes a logical product of both input signals and outputs the logical product; a ½ frequency divider circuit HF11 in which an output signal of the AND circuit AND 11 is supplied to a clock terminal CLK, and a cycle signal TIME having a predetermined specified cycle is supplied to a reset terminal R, and which divides the clock signal CL in half and outputs the halved signal as a ½ divided signal Q1 from an output terminal Q; a ½ frequency divider circuit HF12 in which the ½ divided signal Q1 is supplied to the clock terminal CLK, and the cycle signal TIME having a predetermined specified cycle is supplied to the reset terminal R, and which divides the ½ divided signal Q1 in half and outputs the halved signal as a ¼ divided signal Q2 from the output terminal Q; a ½ frequency divider circuit HF13 in which a ¼ divided signal Q2 is supplied to the clock terminal CLK, and the cycle signal TIME having a predetermined specified cycle is supplied to the reset terminal R, and which halves the ¼ divided signal Q2 and outputs the halved signal as a ⅛ divided signal Q3 from the output terminal Q; and a latching circuit LA1 in which the ⅛ divided signal Q3 is supplied to the clock terminal CLK, and the cycle signal TIME is supplied to the reset terminal R, and which holds the timer signal OUT at the "H" level at a rise timing of the ¼ divided signal Q2.

Referring now to the timing chart of FIG. 18(b), the operation of the timer circuit A03 will be outlined.

When the cycle signal TIME corresponding to a unit time TC switches to the "L" level at time tt21, and the clock signal CL and the power generation state detection signal SPDET switches to the "H" level at time tt22, the AND circuit 11 issues an output signal of the "H" level.

Then, at time tt23, when the clock signal CL falls to the "L" level, the fall is detected, and the ½ divided signal Q1 switches to the "H" level. Thereafter, at time tt24, when the clock signal CL falls to the "L" level again, the fall is detected, and the ½ divided signal Q1 switches to the "L" level. This fall is detected, and the ¼ divided signal Q2 switches to the "H" level.

Thereafter, at time tt25, the power generation state detection signal SPDET switches to the "H" level. At time tt26, when the clock signal CL falls to the "L" level, the fall is detected, and the ½ divided signal Q1 switches back to the "H" level.

At time tt27, when the clock signal CL falls again to the "L" level, the fall is detected, and the ½ divided signal Q1 switches to the "L" level. This fall is detected, and the ¼ divided signal Q2 switches to the "L" level.

As a result, the fall of the ¼ divided signal Q2 is detected, and the ⅛ divided signal Q3 switches to the "H" level. Then, the rise of the ⅛ divided signal Q3 is detected, and the timer signal OUT switches to the "H" level.

In other words, the clock signal falls four times while the power generation state detection signal SPDET is at the "H" level before the timer signal OUT shifts to the "H" level. This is equivalent to the fact that the power generation state detection period (total power generation state time) in the unit time TC is equal to a time that is approximately four times a cycle t0 of the clock signal CL (=4×t0).

The power unit B is equipped with the step-up/down circuit 49; hence, even if the charge voltage VC is somewhat low, the hand operating mechanisms CS and CHM can be driven by boosting the supply voltage by using the step-up/down circuit 49.

Likewise, even if the charge voltage VC is somewhat high and higher than the driving voltage of the hand operating mechanisms CS and CHM, the hand operating mechanisms CS and CHM can be driven by decreasing the supply voltage by using the step-up/down circuit 49.

The central control circuit 93 decides the step-up/down multiplication ratio based on the charge voltage VC to control the step-up/down circuit 49.

However, if the charge voltage VC is excessively low, then a supply voltage sufficient for driving the hand operating mechanisms CS and CHM cannot be obtained even after boosting. In this case, accurate time cannot be displayed when the operation mode is switched from the power saving mode to the display mode, and also power is wastefully consumed.

In order to avoid the above, it has been established as a requirement in which the charge voltage VC is compared with a predetermined set voltage value Vc so as to determine whether the charge voltage VC is sufficient, before switching from the power saving mode to the display mode.

Furthermore, the central control circuit 93 is constituted by: a power saving mode counter 101 for monitoring whether an instructing operation for a predetermined forcible shifting to the power saving mode has been performed within a predetermined time when a user operates an external input device 100; a second hand position counter 102 that always cyclically continues counting and in which a second hand position represented by "count value=0" corresponds to a predetermined specified power saving mode display position (e.g. the position of 1 o'clock); an oscillation stop detecting circuit 103 that detects whether oscillation in the pulse synthesizing circuit 22 has stopped, and issues an oscillation stop detection signal SOSC; a clock generating circuit 104 that generates a clock signal CK based on an output of the pulse synthesizing circuit 22 and outputs the clock signal CK; a limiter & step-up/down control circuit 105 that controls turning ON/OFF of the limiter circuit LM and a step-up/down multiplication ratio of the step-up/down circuit 49 based on the limiter ON signal SLMON, the supply voltage detection signal SPW, the clock signal CK, and the power generation state detection signal SPDET; and a voltage detection control circuit 106 that controls the detecting operation of the supply voltage detecting circuit 92C based on the oscillation stop detection signal SOSC, the supply voltage detection signal SPW, and the power generation state detection signal SPDET.

The modes set as described above are stored in the mode storage unit 94, and the information is supplied to the drive control circuit 24 and the time information storage unit 96. In the drive control circuit 24, switching from the display mode to the power saving mode stops supply of pulse signals to the second hand driving unit 30S and the hour/minute hand driving unit 30HM, causing the second hand driving unit 30S and the hour/minute hand driving unit 30HM to stop their operations. This stops the motor 10 from running, and the time display stops accordingly.

To be more specific, the time information storage unit 96 is constructed by an up/down counter (not shown). When the display mode is switched to the power saving mode, the up/down counter begins to measure time in response to a reference signal generated by the pulse synthesizing circuit 22 and increments a count value (up count), measuring the duration of the power saving mode in terms of a count value.

When the power saving mode is changed over to the display mode, the count value of the up/down counter is decremented (down count). During the down count, a fast forward pulse supplied from the drive control circuit 24 to the second hand driving unit 30S and the hour/minute hand driving unit 30HM is output.

When the count value of the up/down counter is zero, that is, when a fast forward hand operating time equivalent to the duration of the power saving mode and the time elapsed during the fast forward hand operation has passed, a control signal for stopping sending out the fast forward pulses is generated and supplied to the second hand driving unit 30S and the hour/minute hand driving unit 30HM.

As a result, time display is reset to a current time.

Thus, the time information storage unit 96 is also provided with a function for resetting a re-displayed time display to the current time.

Then, the drive control circuit 24 generates a drive pulse according to a mode based on various types of pulses output from the pulse synthesizing circuit 22. First, in the power saving mode, the supply of drive pulses is stopped. Then, immediately after a shift from the power saving mode to the display mode, fast forward pulses having shorter pulse intervals are supplied as drive pulses to the second hand driving unit 30S and the hour/minute hand driving unit 30HM in order to reset re-displayed time display to the current time.

Subsequently, after completion of the supply of the fast forward pulses, drive pulses having normal pulse intervals are supplied to the second hand driving unit 30S and the hour/minute hand driving unit 30HM.

[1.3] Operation of the Embodiment

Referring now to FIG. 2 and FIG. 3, the operation of the first embodiment will be described.

In the following descriptions, it is also assumed that a lowest voltage for driving the hand operating mechanisms CS and CHM is set to a value below 1.2 [V], and that a minimum voltage at which the supply voltage detecting circuit 92C can operate is 0.4 [V].

[1.3.1] for 1.20 [V] or More

In a state wherein the charge voltage VC of the high-capacity secondary power source 48 exceeds 2.5 [V], the limiter ON signal SLMON has been output to the limiter circuit LM, so that the limiter circuit LM is ON, and the limiter circuit LM has the power generating unit A electrically disconnected from the high-capacity secondary power source 48.

In this state, the limiter ON voltage detecting circuit 92A, the pre-voltage detecting circuit 92B, and the supply voltage detecting circuit 92C are all in the operation state.

Thereafter, when the charge voltage VC of the high-capacity secondary power source 48 drops to a level below 2.5 [V], the limiter ON voltage detecting circuit 92A stops outputting the limiter ON signal SLMON to the limiter circuit LM, so that the limiter circuit LM is set to the OFF state.

When the charge voltage VC of the high-capacity secondary power source 48 further drops below 2.3 [V], the pre-voltage detecting circuit 92B stops outputting the limiter operation enable signal SLMEN to the limiter ON voltage detecting circuit 92A, so that the limiter ON voltage detecting circuit 92A is switched to the non-operation state, and the limiter circuit LM is also set to the OFF state.

In the state described above, the limiter & step-up/down control circuit 105 carries out control to cause the step-up/down circuit 49 to perform the 1-fold step-up operation, that is, the non-step-up operation, based on the supply voltage detection signal SPW of the supply voltage detecting circuit 92C, and the hand operating mechanisms CS and CHM still continue to be in the drive state.

[1.3.2] for 1.20 [V] to 0.80 [V]

When the voltage of the high-capacity secondary power source drops below 1.2 [V], the limiter & step-up/down control circuit 105 carries out control to cause the step-up/down circuit 49 to perform the 1.5-fold step-up operation based on a supply voltage detection signal SPW of the supply voltage detecting circuit 92C.

Thus, the step-up/down circuit 49 performs the 1.5-fold step-up operation, and the 1.5-fold step-up operation is continued by the limiter & step-up/down control circuit 105 until the voltage of the high-capacity secondary power source reaches 0.80 [V].

As a result, the charge voltage of the auxiliary capacitor 80 reaches a level of 1.2 [V] or more and below 1.8 [V], and the hand operating mechanisms CS and CHM still continue to be in the drive state.

[1.3.3] for 0.80 [V] to 0.60 [V]

When the voltage of the high-capacity secondary power source drops below 0.80 [V], the limiter & step-up/down control circuit 105 carries out control to cause the step-up/down circuit 49 to perform the double step-up operation based on the supply voltage detection signal SPW of the supply voltage detecting circuit 92C.

Thus, the step-up/down circuit 49 performs the double step-up operation, and the double step-up operation is continued by the limiter & step-up/down control circuit 105 until the voltage of the high-capacity secondary power source reaches 0.60 [V].

As a result, the charge voltage of the auxiliary capacitor 80 reaches a level of 1.20 [V] or more and below 1.6 [V], and the hand operating mechanisms CS and CHM continue to be in the drive state.

[1.3.4] for 0.6 [V] to 0.45 [V]

When the voltage of the high-capacity secondary power source drops below 0.6 [V], the limiter & step-up/down control circuit 105 carries out control to cause the step-up/down circuit 49 to perform the triple step-up operation based on the supply voltage detection signal SPW of the supply voltage detecting circuit 92C.

Thus, the step-up/down circuit 49 performs the triple step-up operation, and the triple step-up operation is continued by the limiter & step-up/down control circuit 105 until the voltage of the high-capacity secondary power source reaches 0.45 [V].

As a result, the charge voltage of the auxiliary capacitor 80 reaches a level of 1.35 [V] or more and below 1.8 [V], and the hand operating mechanisms CS and CHM are placed in the drive state.

[1.3.5] 0.45 [V] to 0.4 [V]

When the voltage of the high-capacity secondary power source 48 drops to 0.45 [V] to 0.4 [V], the step-up/down circuit 49 is placed in the non-operation state, the hand operating mechanisms CS and CHM are placed in the non-drive state, and only charging of the high-capacity secondary power source 48 is carried out.

Thus, wasteful power consumption involved in step-up can be reduced, and the time required for the hand operating mechanisms CS and CHM to be re-driven can be shortened.

In this voltage range, when the supply voltage reaches a voltage at which the supply voltage detecting circuit 92C may malfunction, e.g. when the supply voltage reaches about 0.41 [V], the voltage detection control circuit 106 prohibits, based on the supply voltage detection signal SPW of the supply voltage detecting circuit 92C, the detecting operation of the supply voltage detecting circuit 92C by a detecting operation control signal SDI if the power generation state detection signal SPDET has not been issued from the power generation state detecting unit 91.

To be more specific, if the power generation capable of charging has not been detected by the first detecting circuit 97, that is, if the supply voltage is below 0.41 [V] and the power generation state detection signal SPDET has not been issued, then the supply voltage detecting circuit 92C may make detection errors if it is allowed to operate. For this reason, the detecting operation is prohibited before detection errors are made.

Hence, thereafter, even if the supply voltage drops below 0.41 [V], there will be no room for malfunctions attributable to detection errors made by the supply voltage detecting circuit 92C. Thus, a stable system operation can be maintained.

Even when the supply voltage drops to about 0.41 [V], if the power generation state detection signal SPDET is issued from the power generation state detecting unit 91, then the detecting operation of the supply voltage detecting circuit 92C is maintained.

To be more specific, if the power generation capable of charging is detected by the first detecting circuit 97, that is, if the power generation state detection signal SPDET is being output even when the supply voltage is below 0.41 [V], there is no possibility for the supply voltage to drop further even if the supply voltage detecting circuit 92C is allowed to continue operating. Hence, a stable system operation can be maintained even when the detecting operation by the supply voltage detecting circuit 92C is continued.

[1.4] Advantage of the First Embodiment

As set forth above, according to the first embodiment, if the supply voltage reaches a voltage that may lead to detection errors of the supply voltage detecting circuit, the voltage detecting operation is prohibited if the power generation capable of charging is not detected, or the voltage detecting operation is continued if the power generation capable of charging is detected. Therefore, the supply voltage detecting circuit does not operate at voltages that cause detection errors, thus making it possible to ensure stable operation of the system of the timing device.

[2] SECOND EMBODIMENT

In the first embodiment described above, if the power generation capable of charging is detected by comparing the induced voltage Vgen of the power generating unit 40 with the voltage VC of the high-capacity secondary power source 48, then the operation of the voltage detecting circuit 92C is continued even when the supply voltage drops to a voltage level or less that may cause malfunction of the supply voltage detecting circuit 92C. However, even when the power generation capable of charging is started, the supply voltage does not necessarily immediately reach a voltage that allows the voltage detecting circuit 92 to perform stable operation.

The second embodiment, therefore, is an embodiment in which the operation of the supply voltage detecting circuit 92C is prohibited until the supply voltage reaches a voltage that permits the voltage detecting circuit 92 to perform stable operation.

Referring now to FIG. 2 and FIG. 3, a major operation of the second embodiment will be described.

As in the case of the first embodiment, when the voltage of the high-capacity secondary power source 48 reaches 0.45 [V] to 0.4 [V] or more, the step-up/down circuit 49 is placed in the non-operation state, the hand operating mechanisms CS and CHM are placed in the non-drive state, and only charging of the high-capacity secondary power source 48 is performed.

Thus, wasteful power consumption involved in step-up can be reduced, and the time required for the hand operating mechanisms CS and CHM to be re-driven can be shortened.

In this voltage range, if the supply voltage reaches a voltage at which the supply voltage detecting circuit 92C may malfunction, e.g. if the supply voltage reaches about 0.41 [V], the voltage detection control circuit 106 prohibits, based on the supply voltage detection signal SPW of the supply voltage detecting circuit 92C, the detecting operation by the supply voltage detecting circuit 92C by a detecting operation control signal SDI if the power generation state detection signal SPDET has not been issued from the power generation state detecting unit 91.

To be more specific, if the power generation capable of charging has not been detected by the first detecting circuit 97, or even when the power generation capable of charging has been detected by the first detecting circuit 97, if a second detecting circuit 98 detects that a duration Tge of the power generation capable of charging has not exceeded a set time value To1 or a total power generation time per unit time has not exceeded a set time value To2, that is, the supply voltage is below 0.41 [V] and the power generation state detection signal SPDET has not been issued, then the supply voltage detecting circuit 92C may make detection errors if it is allowed to operate. For this reason, the detecting operation is prohibited before detection errors are made.

Hence, thereafter, even if the supply voltage drops below 0.41 [V], there will be no room for malfunctions attributable to detection errors made by the supply voltage detecting circuit 92C. Thus, a stable system operation can be maintained.

Even when the supply voltage drops to about 0.41 [V], if the power generation state detection signal SPDET is issued from the power generation detecting unit 91, it means that the power generation capable of charging has been detected by the first detecting circuit 97 and the second detecting circuit 98 has detected that the duration Tge of the power generation capable of charging exceeded the set time value To1 or the total power generation time per unit time exceeded the set time value To2. Therefore, the detecting operation of the supply voltage detecting circuit 92C is maintained.

To be more specific, if the power generation capable of charging has been detected by the first detecting circuit 97 and the second detecting circuit 98 detects that the duration Tge of the power generation capable of charging has exceeded the set time value To1 or the total power generation time per unit time has exceeded the set time value To2, that is, if the power generation state detection signal SPDET has been output even when the supply voltage is below 0.41 [V], then there is no possibility for the supply voltage to drop further, and the supply voltage detecting circuit 92C can be operated stably in the current state, so that a stable system operation can be maintained even if the detecting operation of the voltage detecting circuit 92C is continued.

[2.1] Advantage of the Second Embodiment

As set forth above, according to the second embodiment, if the supply voltage reaches a voltage that may lead to detection errors of the supply voltage detecting circuit, then the voltage detecting operation is prohibited if the power generation capable of charging has not been detected or the duration of the power generation capable of charging has not exceeded the set time value or the total power generation time per unit time has not exceeded the set time value even when the power generation capable of charging has been detected. The voltage detecting operation is continued if the power generation capable of charging has been detected, and the duration of the power generation capable of charging has exceeded the set time value or the total power generation time per unit time has exceeded the set time value. Hence, the supply voltage detecting circuit does not operate at a voltage that may lead to detection errors, thus permitting stable operation of the system of the timing device to be accomplished.

[3] THIRD EMBODIMENT

A third embodiment is an embodiment for preventing detection errors of the voltage detecting circuit in a case where a step-up/down circuit clock of the step-up/down circuit 49 stops.

[3.1] Technical Background of the Third Embodiment

If the supply voltage drops or a reference oscillation source 21 stops due to some cause, such as an external noise, or the output of pulse signals from a pulse synthesizing circuit 22 stops, then the step-up/down clock stops with a consequent change in voltage after a step-up or step-down in a system that employs a voltage after a step-up or step-down (the voltage VC1 of the auxiliary capacitor 80 in FIG. 3).

As a result, the supply voltage of the supply voltage detecting circuit may fall in a voltage range in which the supply voltage detecting circuit makes detection errors, interfering with stable operation of the system.

Accordingly, the third embodiment is an embodiment adapted to prohibit the detecting operation of the supply voltage detecting circuit to prevent detection errors of the supply voltage detecting circuit if the reference oscillation source 21 stops or the output of the pulse signals from the pulse synthesizing circuit 22 stops, thus ensuring stable operation of the system.

[3.2] Operation of the Third Embodiment

Referring now to FIG. 2 and FIG. 3, the major operation of the third embodiment will be described.

An oscillation stop detecting circuit 103 detects via the pulse synthesizing combining circuit 22 whether the oscillation in the reference oscillation source 21 has stopped or the oscillation in the pulse synthesizing circuit 22 has stopped. If an oscillation stop is detected, then the oscillating stop detecting circuit 103 outputs an oscillation stop detection signal SOSC to a voltage detection control circuit 106.

With this arrangement, the voltage detection control circuit 106 prohibits the detecting operation of a supply voltage detecting circuit 92C by a detecting operation control signal SDI if a power generation state detection signal SPDET is not being issued from a power generation state detecting unit 91.

To be more specific, if the power generation capable of charging has not been detected by the first detecting circuit 97, and if the oscillation stop detecting circuit 103 detects that the oscillation in the reference oscillation source 21 or the pulse synthesizing circuit 22 has stopped, then the supply voltage detecting circuit 92C may make detection errors due to a sudden change in the power caused by the stop of the step-up/down clock of the step-up/down circuit 49 if the supply voltage detecting circuit 92C is allowed to continue its operation. For this reason, the detecting operation is prohibited before detection errors are made.

Thus, there will be no room for the occurrence of malfunction caused by detection errors of the supply voltage detecting circuit 92C, making it possible to maintain stable system operation.

If the power generation state detection signal SPDET is being output from the power generation state detecting unit 91, and if the oscillation stop detecting circuit 103 detects that the oscillation in the reference oscillation source 21 or the pulse synthesizing circuit 22 has stopped, then the detecting operation of the supply voltage detecting circuit 92C is maintained.

To be more specific, as in the case of the first embodiment, if the power generation capable of charging has been detected by the first detecting circuit 97, or, as in the case of the second embodiment, if the power generation capable of charging has been detected by the first detecting circuit 97 and the second detecting circuit 98 detects that the duration Tge of the power generation capable of charging has exceeded the set time value To1 or the total power generation time per unit time has exceeded the set time value To2, that is, if the oscillation has stopped, then there is no possibility for the supply voltage to drop further even if the supply voltage detecting circuit 92C is allowed to operate, as long as the power generation state detection signal SPDET is being output. Therefore, the supply voltage detecting circuit 92C can be operated stably in the current state, so that a stable system operation can be maintained even if the detecting operation of the voltage detecting circuit 92C is continued.

[3.3] Advantage of the Third Embodiment

As set forth above, according to the third embodiment, if the oscillation of the reference oscillation source or the pulse synthesizing circuit stops and if the supply voltage reaches a voltage that may lead to detection errors of the supply voltage detecting circuit, then the voltage detecting operation is prohibited. If the power generation capable of charging is detected and if the oscillation of the reference oscillation source or the pulse synthesizing circuit stops, then the voltage detecting operation is continued. Therefore, the supply voltage detecting circuit does not operate at voltages that may cause detection errors, allowing stable operation of the system of the timing device to be accomplished.

[4] ADVANTAGES OF THE EMBODIMENTS

As described above, according to the foregoing embodiments, even if the supply voltage should drop due to some cause, detection errors of the supply voltage detecting circuit can be prevented, thus making it possible to ensure stable operation of the entire system.

[5] MODIFICATIONS OF THE EMBODIMENTS

[5.1] First Modification

The above descriptions have been given of the cases where voltage detection in the supply voltage detecting circuit is steadily performed. The present invention, however, can be also applied to a case where the voltage detection is intermittently performed to reduce consumed power.

Such a case may be handled in the same manner as those of the embodiments in an operation state.

[5.2] Second Modification

The various voltage values in the foregoing descriptions are just examples, and may be obviously changed as necessary according to associated electronic devices.

[5.3] Third Modification

In the above embodiments, the descriptions have been given only of the supply voltage detecting circuit. The present invention can be applied in the same fashion to other voltage detecting circuits that require prevention of detection errors caused by a drop in an operating voltage.

[5.4] Fourth Modification

In the above embodiments, as the power generating unit 40, the electromagnetic power generating unit is used in which the rotational motion of the oscillating weight 45 is transmitted to the rotor 43, and the electromotive force Vgen is generated in the output coil 44 by the rotation of the rotor 43; the present invention, however, is not limited thereto. The power generating unit 40 may alternatively be, for example, a power generating unit in which the rotational motion is generated by a restoring force of a spiral spring (corresponding to the first energy) and the electromotive force is generated by the rotational motion, or a power generating unit in which oscillation or displacement produced externally or by self-excitation (corresponding to the first energy) is applied to a piezoelectric unit so as to generate electric power by the piezoelectric effect.

Furthermore, the power generating unit may be the one that produces electric power by photoelectric conversion utilizing optical energy (corresponding to the first energy), such as sunshine.

Moreover, the power generating unit may be the one that produces electric power by thermal electric conversion based on a temperature difference between a certain portion and another portion (the heat energy corresponds to the first energy).

In addition, it is also possible to configure the system using an electromagnetic inductive power generating unit adapted to receive floating electromagnetic waves, such as broadcasting or communication waves, to utilize their energy (corresponding to the first energy).

[5.5] Fifth Modification

The above embodiments have been described, taking the wristwatch type timing device 1 as an example; however, the present invention is not limited thereto. The present invention may be also applied to pocket watches or the like in addition to the wristwatches. Furthermore, the present invention can be also applied to electronic devices, including electronic calculators, portable telephones, portable personal computers, electronic pocketbooks, portable radios, and portable VTRs.

[5.6] Sixth Modification

In the foregoing descriptions, the control is carried out based on the charge voltage VC of the high-capacity secondary power source 48. It is also possible, however, to configure the system so as to carry out the control based on the charge voltage VC1 of the auxiliary capacitor 80 or an output voltage of the step-up/down circuit 49.

[6] ADVANTAGES OF THE EMBODIMENTS

As described above, according to the embodiments, even if the supply voltage should drop due to some cause, detection errors of the voltage detecting circuit can be prevented, making it possible to ensure stable operation of the entire system of an electronic device.

What is claimed is:

1. In a portable electronic device, an electronic device comprising:

power generating means for generating electric power by converting first energy into electrical energy;

power means for storing electrical energy generated by the power generating means;

driven means driven by the electrical energy supplied from the power means;

power generation detecting means for detecting whether the power generating means is generating storable electric power that is sufficient to be stored in the power means;

stored power voltage detecting means for detecting a stored power voltage of the power means;

operating voltage detecting means for detecting whether the stored power voltage of the power means has reduced to an operating voltage of the stored power voltage detecting means or less; and voltage detection control means for prohibiting an operation of the stored power voltage detecting means if the operating voltage detecting means detects that the stored power voltage of the power means has dropped to the operating voltage or less and the power generation detecting means does not detect the generation of storable power.

2. An electronic device according to claim 1, wherein the voltage detecting control means detects that no storable power is being generated unless the power generation detecting means detects continuous generation of storage power for a predetermined specified time or more.

3. An electronic device according to claim 1, wherein the voltage detection control means detects that no storable power is being generated unless the power generation detecting means detects storable power generation during a total time per preset unit time that exceeds a preset reference total time.

4. An electronic device according to claim 1, wherein the voltage detection control means controls the stored power voltage detecting means to intermittently perform a detecting operation when the stored power voltage detecting means is in an operable state.

5. An electronic device according to claim 1, wherein the driven means has time-measuring means for displaying time.

6. An electronic device according to claim 1, wherein the voltage detection control means comprises timer means that starts measuring duration of the generation of storable power when the power generation detecting means detects that the generation of storable power sufficient to be stored at the power means is being performed, and resets the measured duration when the power generation detecting means detects that the generation of storable power is not being performed, and the voltage detection control means detects that storable power is being generated when the duration reaches a predetermined specified time or more.

7. An electronic device according to claim 1, wherein the voltage detection control means comprises timer means that adds up power generation detection times during a period in which the power generation detecting means detects that the generation of power sufficient to be stored in the power means is being performed, and resets a total value of the power generation detection times at every predetermined specified unit time, and the voltage detection control means detects that the generation of storable power has been detected only when a total time per unit time of the time in which the generation of storable power is detected exceeds a predetermined specified time.

8. In a portable electronic device, an electronic device comprising:

oscillating means for outputting an oscillation signal having a predetermined frequency;

clock generating means for generating a predetermined clock signal based on the oscillation signal;

power generating means for generating electric power by converting first energy into electrical energy;

power means for storing electrical energy;

driven means driven by the electrical energy supplied from the power means;

step-up/down means for increasing or decreasing a voltage of the electrical energy generated by the power generating means based on the clock signal, and supplying the increased or decreased voltage to the power means for storage;

oscillation state detecting means for detecting whether the oscillation means is at rest;

power generation detecting means for detecting whether the power generating means is generating storable electric power that is sufficient to be stored in the power means;

stored power voltage detecting means for detecting a stored power voltage of the power means; and voltage detection control means for prohibiting an operation of the stored power voltage detecting means if the oscillation state detecting means detects that the oscillation means is at rest and the power generation detecting means detects that storable power is not being generated, while allowing the stored power voltage detecting means to operate if the oscillation state detecting means detects that the oscillation means is at rest and the power generation detecting means detects that storable power is being generated.

9. An electronic device according to claim 8, wherein the power means comprises first power means for storing electrical energy generated by the power generating means, and second power means for storing electrical energy supplied by the step-up/down means that increases or decreases a voltage of the electrical energy stored in the first power means, and the stored power voltage detecting means comprises first stored power voltage detecting means for detecting a stored power voltage of the first power means and a second stored power voltage detecting means for detecting a stored power voltage of the second power means.

10. An electronic device according to claim 8, wherein the voltage detecting control means detects that no storable power is being generated unless the power generation detecting means detects continuous generation of storage power for a predetermined specified time or more.

11. An electronic device according to claim 8, wherein the voltage detection control means detects that no storable power is being generated unless the power generation detecting means detects storable power generation during a total time per preset unit time that exceeds a preset reference total time.

12. An electronic device according to claim 8, wherein the voltage detection control means controls the stored power voltage detecting means to intermittently perform a detecting operation when the stored power voltage detecting means is in an operable state.

13. An electronic device according to claim 8, wherein the driven means has time-measuring means for displaying time.

14. An electronic device according to claim 8, wherein the voltage detection control means comprises timer means that starts measuring duration of the generation of storable power when the power generation detecting means detects that the generation of storable power sufficient to be stored at the power means is being performed, and resets the measured duration when the power generation detecting means detects that the generation of storable power is not being performed, and the voltage detection control means detects that storable power is being generated when the duration reaches a predetermined specified time or more.

15. An electronic device according to claim 8, wherein the voltage detection control means comprises timer means that adds up power generation detection times during a period in which the power generation detecting means detects that the generation of power sufficient to be stored in the power means is being performed, and resets a total value of the power generation detection times at every predetermined specified unit time, and the voltage detection control means detects that the generation of storable power has been detected only when a total time per unit time of the time in which the generation of storable power is detected exceeds a predetermined specified time.

16. A control method for a portable electronic device comprising a power generating unit for generating electric power by converting first energy into electrical energy, a power unit for storing electrical energy obtained by power generation, and a driven unit driven by the electrical energy supplied from the power unit, the control method comprising:
    detecting whether the power generating unit is generating storable electric power that is sufficient to be stored in the power unit;
    detecting a stored power voltage of the power unit;
    detecting whether the stored power voltage of the power unit has reduced to an operating voltage of the stored power voltage or less; and
    prohibiting detection of stored power voltage if the stored power voltage of the power unit has dropped to the operating voltage or less and storable power is not being generated.

17. A control method for an electronic device according to claim 16, wherein
the driven unit has a time-measuring unit for displaying time, and including displaying time.

18. A control method for a portable electronic device comprising an oscillating unit for outputting an oscillation signal having a predetermined frequency, a clock generating unit for generating a predetermined clock signal based on the oscillation signal, a power generating unit for generating electric power by converting first energy into electrical energy, a power unit for storing electrical energy, a driven unit driven by the electrical energy supplied from the power unit, and a step-up/down unit for increasing or decreasing a voltage of the electrical energy obtained by power generation based on the clock signal, and supplying the voltage to be stored in the power unit, the control method comprising:
    detecting whether the oscillation unit is at rest;
    detecting whether the power generating unit is generating storable electric power that is sufficient to be stored in the power unit;
    detecting a stored power voltage of the power unit; and
    prohibiting detecting a stored power voltage if the oscillation unit is at rest and storable power is not being generated, while allowing the detecting of stored power voltage if the oscillation unit is at rest and storable power is being generated.

19. A control method for an electronic device according to claim 18, wherein
the driven unit has a time-measuring unit for displaying time, and including displaying time.

20. In a portable electronic device,
an electronic device comprising:
    a power generating unit that generates electric power by converting first energy into electrical energy;
    a power unit that stores electrical energy generated by the power generating unit;
    a driven unit driven by the electrical energy supplied from the power unit;
    a power generation detecting unit that detects whether the power generating unit is generating storable electric power that is sufficient to be stored in the power unit;
    a stored power voltage detecting unit that detects a stored power voltage of the power unit;
    an operating voltage detecting unit that detects whether the stored power voltage of the power unit has reduced to an operating voltage of the stored power voltage detecting unit or less; and
    a voltage detection control unit that prohibits an operation of the stored power voltage detecting unit if the operating voltage detecting unit detects that the stored power voltage of the power unit has dropped to the operating voltage or less and the power generation detecting unit does not detect the generation of storable power.

21. An electronic device according to claim 20, wherein the voltage detecting control unit detects that no storable power is being generated unless the power generation detecting unit detects continuous generation of storage power for a predetermined specified time or more.

22. An electronic device according to claim 20, wherein the voltage detection control unit detects that no storable power is being generated unless the power generation detecting unit detects storable power generation during a total time per preset unit time that exceeds a preset reference total time.

23. An electronic device according to claim 20, wherein the voltage detection control unit controls the stored power voltage detecting unit to intermittently perform a detecting operation when the stored power voltage detecting unit is in an operable state.

24. An electronic device according to claim 20, wherein the driven unit has a time-measuring unit for displaying time.

25. An electronic device according to claim 20, wherein the voltage detection control unit comprises a timer unit that starts measuring duration of the generation of storable power when the power generation detecting unit detects that the generation of storable power sufficient to be stored at the power unit is being performed, and resets the measured duration when the power generation detecting unit detects that the generation of storable power is not being performed, and the voltage detection control unit detects that storable power is being generated when the duration reaches a predetermined specified time or more.

26. An electronic device according to claim 20, wherein the voltage detection control unit comprises a timer unit that adds up power generation detection times during a period in which the power generation detecting unit detects that the generation of power sufficient to be stored in the power unit is being performed, and resets a total value of the power generation detection times at every predetermined specified unit time, and the voltage detection control unit detects that the generation of storable power has been detected only when a total time per unit time of the time in which the generation of storable power is detected exceeds a predetermined specified time.

27. In a portable electronic device,
an electronic device comprising:
   an oscillating unit that outputs an oscillation signal having a predetermined frequency;
   a clock generating unit that generates a predetermined clock signal based on the oscillation signal;
   a power generating unit that generates electric power by converting first energy into electrical energy;
   a power unit that stores electrical energy;
   a driven unit driven by the electrical energy supplied from the power unit;
   a step-up/down unit that increases or decreases a voltage of the electrical energy generated by the power generating unit based on the clock signal, and supplies the increased or decreased voltage to the power unit for storage;
   an oscillation state detecting unit that detects whether the oscillation unit is at rest;
   a power generation detecting unit that detects whether the power generating unit is generating storable electric power that is sufficient to be stored in the power unit;
   a stored power voltage detecting unit that detects a stored power voltage of the power unit; and
   a voltage detection control unit that prohibits an operation of the stored power voltage detecting unit if the oscillation state detecting unit detects that the oscillation unit is at rest and the power generation detecting unit detects that storable power is not being generated, while allowing the stored power voltage detecting unit to operate if the oscillation state detecting unit detects that the oscillation unit is at rest and the power generation detecting unit detects that storable power is being generated.

28. An electronic device according to claim 27, wherein the voltage detecting control unit detects that no storable power is being generated unless the power generation detecting unit detects continuous generation of storage power for a predetermined specified time or more.

29. An electronic device according to claim 27, wherein the voltage detection control unit detects that no storable power is being generated unless the power generation detecting unit detects storable power generation during a total time per preset unit time that exceeds a preset reference total time.

30. An electronic device according to claim 27, wherein the voltage detection control unit controls the stored power voltage detecting unit to intermittently perform a detecting operation when the stored power voltage detecting unit is in an operable state.

31. An electronic device according to claim 27, wherein the driven unit has a time-measuring unit for displaying time.

32. An electronic device according to claim 27, wherein the voltage detection control unit comprises a timer unit that starts measuring duration of the generation of storable power when the power generation detecting unit detects that the generation of storable power sufficient to be stored at the power unit is being performed, and resets the measured duration when the power generation detecting unit detects that the generation of storable power is not being performed, and the voltage detection control unit detects that storable power is being generated when the duration reaches a predetermined specified time or more.

33. An electronic device according to claim 27, wherein the voltage detection control unit comprises a timer unit that adds up power generation detection times during a period in which the power generation detecting unit detects that the generation of power sufficient to be stored in the power unit is being performed, and resets a total value of the power generation detection times at every predetermined specified unit time, and the voltage detection control unit detects that the generation of storable power has been detected only when a total time per unit time of the time in which the generation of storable power is detected exceeds a predetermined specified time.

34. An electronic device according to claim 27, wherein the power unit comprises a first power unit for storing electrical energy generated by the power generating unit, and a second power unit for storing electrical energy supplied by the step-up/down unit that increases or decreases a voltage of the electrical energy stored in the first power unit, and the stored power voltage detecting unit comprises a first stored power voltage detecting unit that detects a stored power voltage of the first power unit and a second stored power voltage detecting unit that detects a stored power voltage of the second power unit.

* * * * *